US010332420B2

(12) United States Patent
Sacher et al.

(10) Patent No.: US 10,332,420 B2
(45) Date of Patent: Jun. 25, 2019

(54) WEIGHT-LOSS SERVICE THAT SUPPORTS MULTIPLE REMOTE USERS IN LOSING WEIGHT

(71) Applicant: MILES-BRAMWELL EXECUTIVE SERVICES LIMITED, Derbyshire (GB)

(72) Inventors: Paul Sacher, Derbyshire (GB); Jan Boxshall, Derbyshire (GB); Rebecca Robinson, Derbyshire (GB); Robyn Glen, Derbyshire (GB); Matt Woodcock, Derbyshire (GB); Simon Cattermole, Derbyshire (GB); Yvonne Sanders, Derbyshire (GB)

(73) Assignee: MILES-BRAMWELL EXECUTIVE SERVICES LIMITED, Derbyshire (GB)

( * ) Notice: Subject to any disclaimer, the term of this patent is extended or adjusted under 35 U.S.C. 154(b) by 509 days.

(21) Appl. No.: 15/207,912

(22) Filed: Jul. 12, 2016

(65) Prior Publication Data

US 2018/0018902 A1 Jan. 18, 2018

(51) Int. Cl.
*G06F 3/0482* (2013.01)
*G09B 19/00* (2006.01)
(Continued)

(52) U.S. Cl.
CPC ....... *G09B 19/0092* (2013.01); *G06F 3/0482* (2013.01); *G06F 3/0488* (2013.01); *H04L 51/18* (2013.01)

(58) Field of Classification Search
None
See application file for complete search history.

(56) References Cited

U.S. PATENT DOCUMENTS

| 2004/0035611 | A1* | 2/2004 | Honda | A61B 5/0537 177/25.19 |
| 2006/0229504 | A1* | 10/2006 | Johnson, Jr. | G06F 19/3475 600/300 |
| 2010/0227302 | A1* | 9/2010 | McGilvery | G09B 19/0038 434/236 |

* cited by examiner

*Primary Examiner* — Tuan S Nguyen
(74) *Attorney, Agent, or Firm* — Pearne & Gordon LLP

(57) ABSTRACT

A method including, at a computer: causing a man machine interface to be provided to each one of a plurality of remote users, wherein the man machine interface is configured to enable a remote user to be specified to have a particular user state selected from a group comprising an output state and a potential-input state but not comprising a live-input state; causing a command interface to be provided to a remote administrator, wherein the command interface is configured to enable the remote administrator to change a user state from a potential-input state to a live-input state and configured to enable the remote administrator to input comment; causing a first variant of the first man machine interface to be provide to a remote user while the remote user has a live-input state, wherein the first variant of the man machine interface is configured to enable the remote user, while the remote user has the live-input state, to input comment to be read by other remote users and to read comments input by the remote administrator and read comments input by remote users, if any, simultaneously having the live-input state; causing a second variant of the man machine interface to be provided to a remote user while the remote user has a potential-input state, wherein the second variant of the man machine interface is configured to enable the remote user having the potential-input state to read comments input by the remote administrator and read comments input by remote users having the live-input state but is not configured to enable the remote user, while the remote user has the potential-input state, to input comment to be read by other (Continued)

remote users; and causing a third variant of the man machine interface to be provided to a remote user while the remote user has an output state, wherein the third variant of the man machine interface is configured to enable the remote user having the output state to read comments input by the remote administrator and read comments input by other remote users having, the live-input state but is not configured to enable the remote user, while the remote user has the potential-input state, to input comment to be read by other remote users.

24 Claims, 35 Drawing Sheets

(51) Int. Cl.
*G06F 3/0488* (2013.01)
*H04L 12/58* (2006.01)

ENTRY POINTS
JOURNEY 1
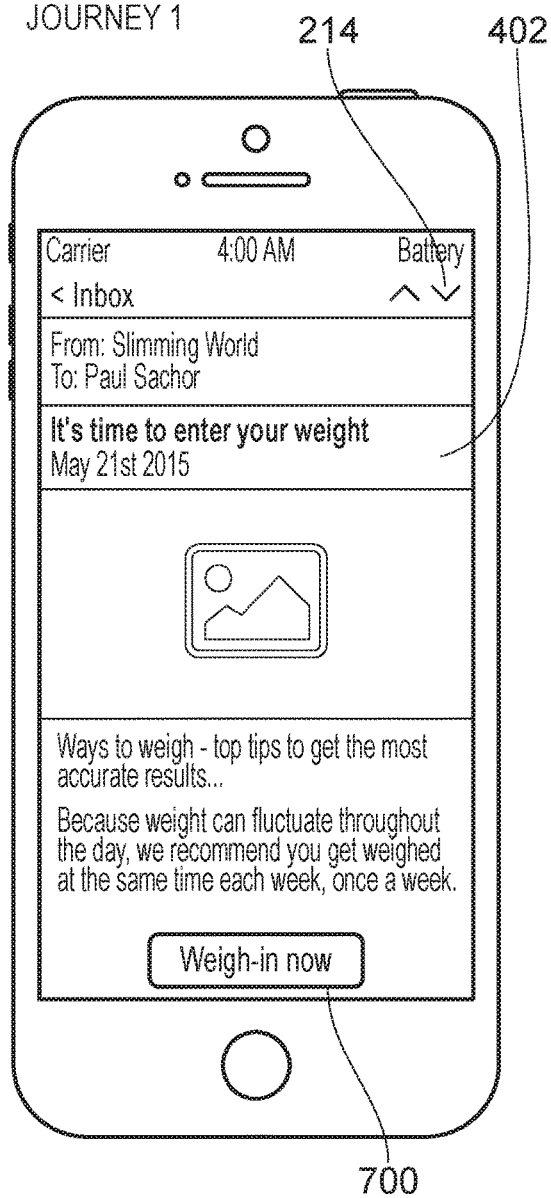
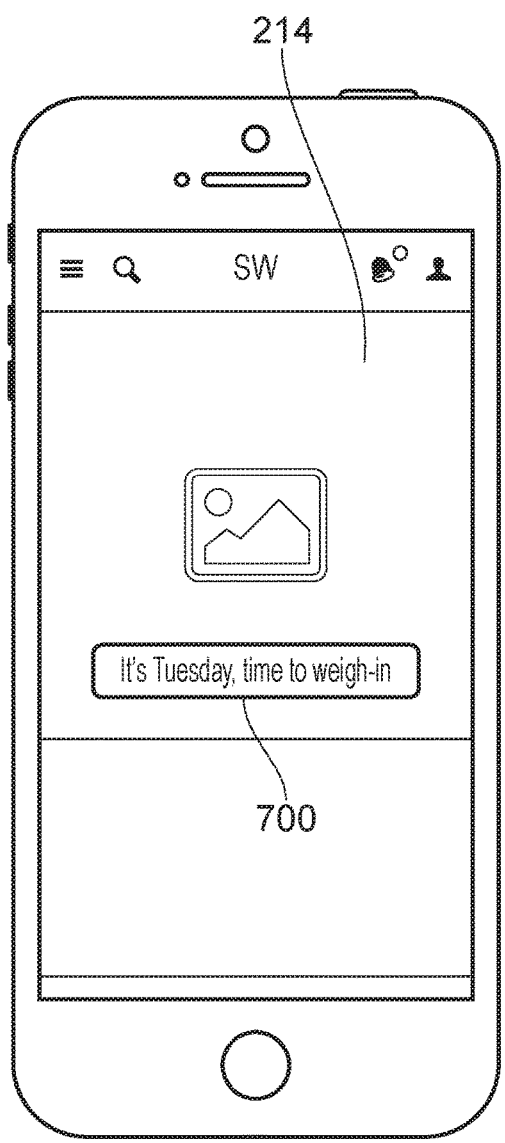
FIG. 5A
FIG. 5B

STATUS UPDATE
LEAVING A NOTE (OPTIONAL)

COMMITMENT SCREENS

COMMITMENT SCREENS

PERSONAL SUPPORT

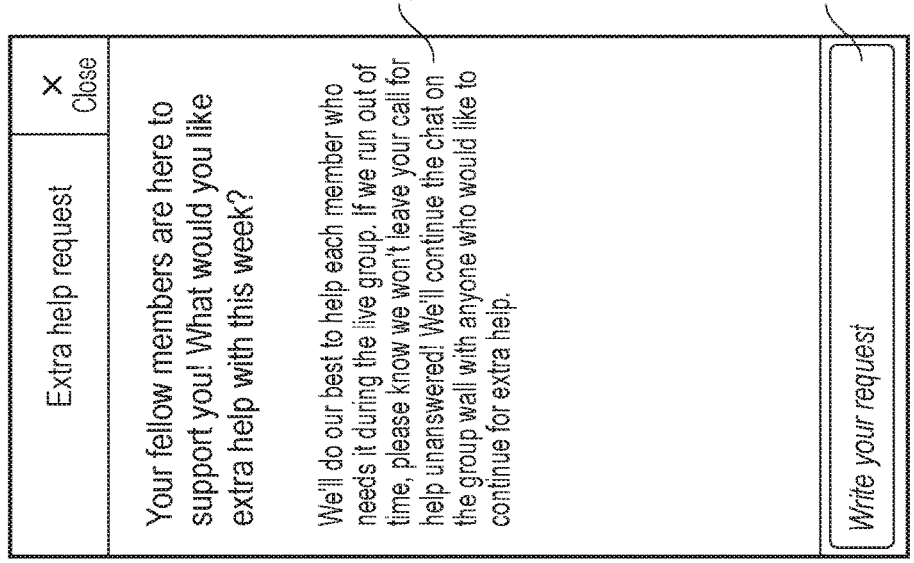
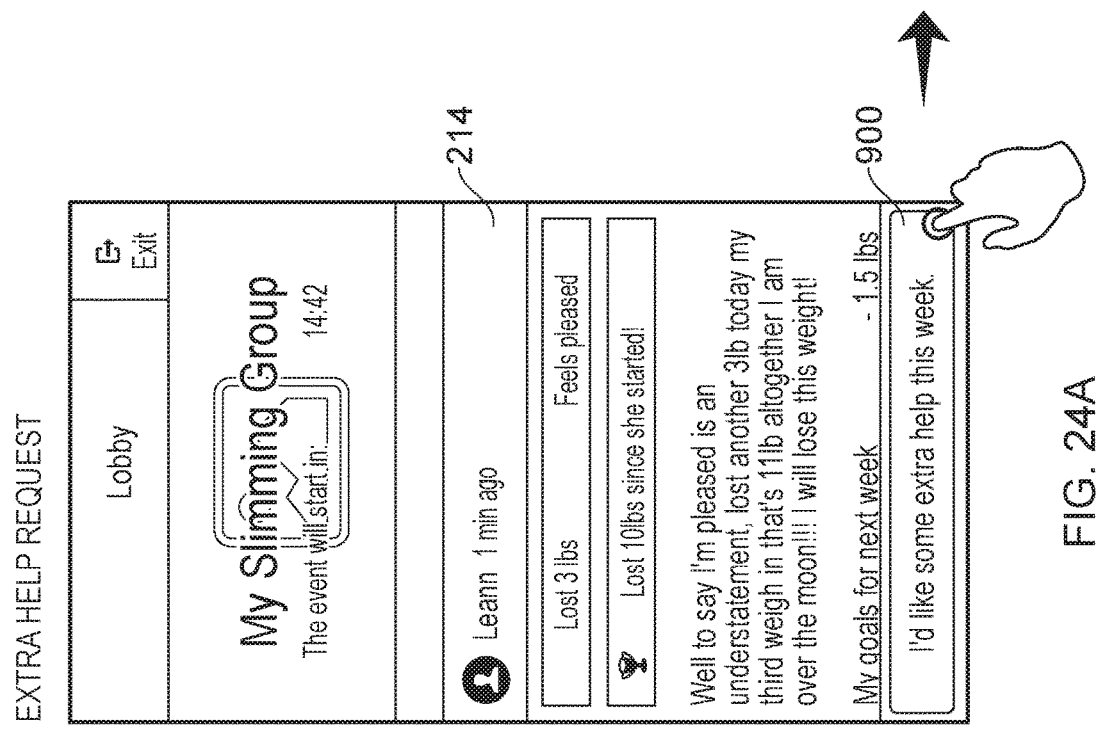
FIG. 24B
FIG. 24A

CELEBRATIONS

| goals | Welcome<br>● ○ ○ ○ | group |
|---|---|---|

Hello Tuesday evening Super Slimmers!

We're ready to get started with this week's real time, online group and are looking forward to hearing from each of you. Remember that this is your chance to share, to shine, to support and be supported.

George Clooney 1 min ago

New members this week

[Michelle]  [Andrea]

[Applaud] — 920

FIG. 25A

| goals | Award ceremony<br>○ ● ○ ○ | group |
|---|---|---|

Next we're celebrating our superstar award achievers for this week:

George Clooney 1 min ago

[10 lb]  [Bronze]  [Newb]
[Bronze]  [Newb]

[Applaud] — 920

FIG. 25B

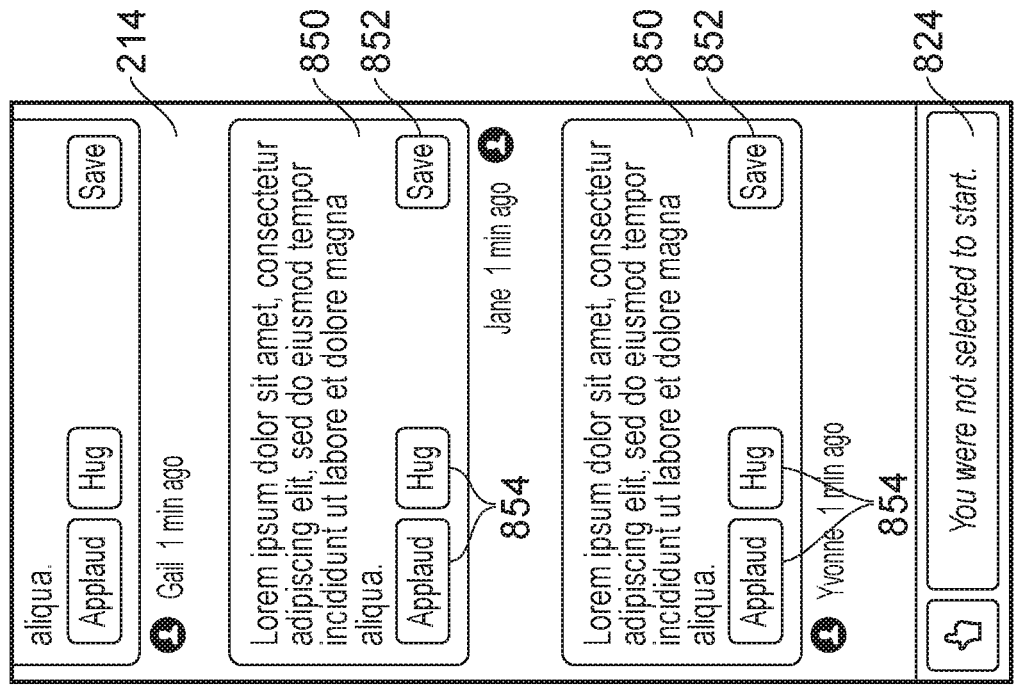
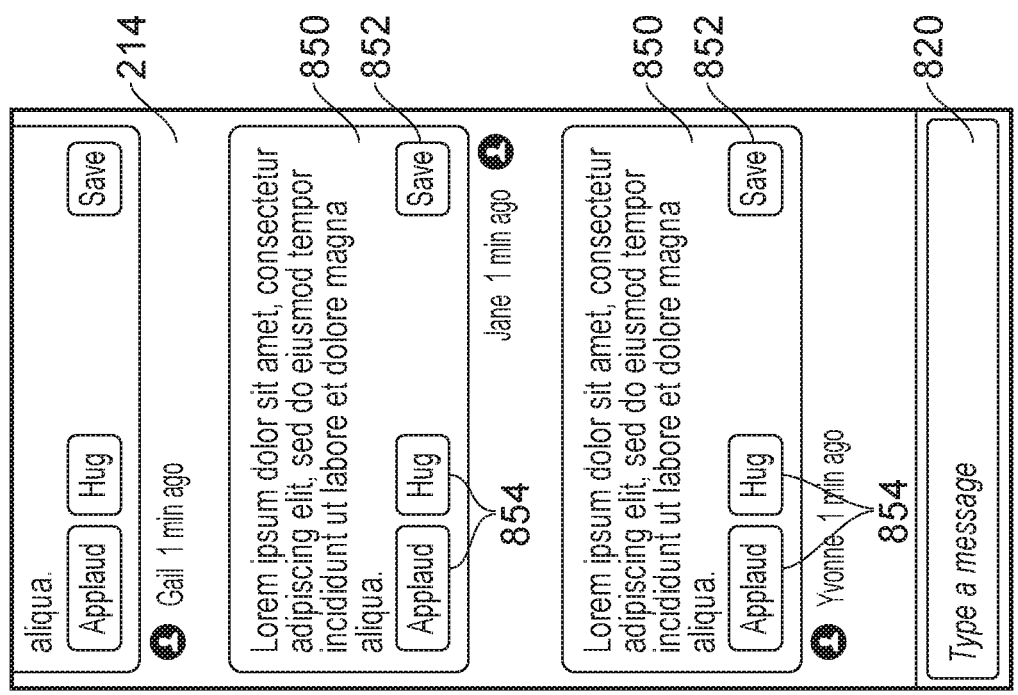
FIG. 26C
FIG. 26D

WEIGHT-LOSS SERVICE THAT SUPPORTS MULTIPLE REMOTE USERS IN LOSING WEIGHT

TECHNOLOGICAL FIELD

Remote communication between users over a network to provide a weight-loss service that supports multiple remote users in losing weight.

BACKGROUND

Slimming World™ provides a successful weight-loss service that supports multiple users in losing weight via face-to-face, in person meetings and via a healthy eating plan called Food Optimising™.

While such face-to-face, in person meetings are effective they are not always attractive to users because of accessibility issues, including travel time to meetings and/or because some users are uncomfortable having face-to-face, in person meetings/discussions concerning personal matters.

The face to face, in person meetings are hosted by a Slimming World highly trained Consultant who facilitates the discussion. The physical proximity of the users and Consultant creates verbal and non-verbal cues that help the Consultant manage the meeting and facilitate tailored support, motivation and commitment for the week ahead for each person present. Such cues may be absent, without careful design, in telecommunications.

There are significant technical difficulties in creating a man machine interface and process flow that capture aspects of a face-to-face, in person Consultant-led meeting over a remote communications network within the bandwidth and hardware constraints of typical user equipment.

BRIEF SUMMARY

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which:

FIGS. 5A-17C illustrate examples of man machine interfaces provided by the systems illustrated in FIGS. 4A and 4B;

FIGS. 23A-23D illustrates an example of a man machine interface presented by the live event module during a 'lobby' stage;

FIGS. 24A-24D illustrates an example of a man machine interface presented by the live event module after the user selects the option to create a subject/question during the 'lobby' stage;

FIGS. 25A-25D illustrates an example of a man machine interface presented by the live event module after the main event of the live event has started;

FIGS. 26A-26E illustrate an example of a man machine interface presented by the live event module during a chat round to every user.

DETAILED DESCRIPTION

Figure 1A:
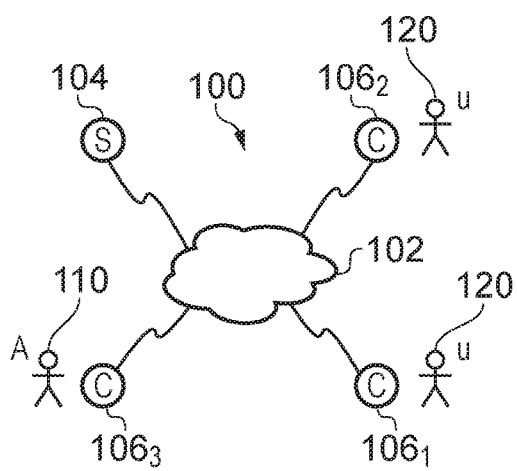
FIG. 1A illustrates an example of a system.

FIG. 1A illustrates an example of a system 100. The system 100 comprises a server 104 that communicates with clients 106$_n$ via a communication network 102, for example, the Internet.

The server 104 may be a machine such as a computer, for example, that is configured to communicate with clients 106$_n$ via a network 102 to provide a service.

A client 106$_n$ may be a machine such as a computer, for example, that is configured to communicate with the server 104 to provide a service.

In this example an administrator 110 of the service uses client device 106$_3$ to control the service. Users 120 use client device 106$_1$, 106$_2$ to receive the service.

The service is a weight-loss service that supports multiple remote users in losing weight (mass).

The system enables real-time communication between a large number of remote users 120 across significant distances.

Figure 1B:
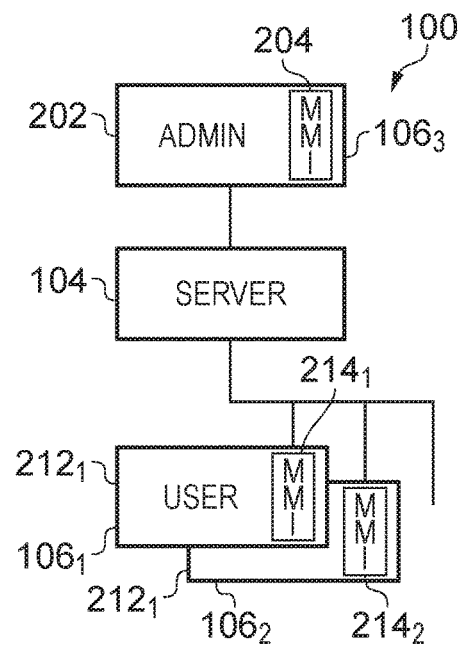
FIG. 1B illustrates one possible architecture of the system.

FIG. 1B illustrates one possible architecture of the system 100.

The client device 106$_3$ is an administrator device 202 controlled by an administrator of the service via man machine interface 204. The man machine interface 204 is a control or command interface for controlling aspects of the service.

The client device 106$_1$ is a user device 212$_1$ that receives input from and provides output to a user 120 of the service via a man machine interface 214$_1$. The man machine interface 214$_1$ is a user interface for a first user 120$_1$ to consume the service.

The client device 106$_2$ is a user device 212$_2$ that receives input from and provides output to a user 120 of the service via a man machine interface 214$_2$. The man machine interface 214$_2$ is a user interface for a second user 120$_2$ to consume the service.

The administrator device 202 communicates through the server 104 to the multiple user devices 212. Although only two user devices 212 are illustrated in this example, it should be appreciated that the system scales to allow the server to communicate with tens, hundreds or thousands of client devices 106 simultaneously.

Figure 2A:
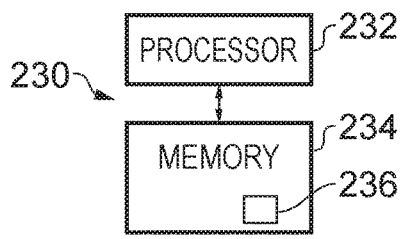
FIG. 2A illustrates an example of a controller.

FIG. 2A illustrates an example of a controller 230 that may be used in a server device 104 or a client device 106.

Implementation of a controller 230 may be as controller circuitry. The controller 230 may be implemented in hardware alone, have certain aspects in software including firmware alone or can be a combination of hardware and software (including firmware).

As illustrated in FIG. 2A the controller 230 may be implemented using instructions that enable hardware functionality, for example, by using executable instructions of a computer program 236 in a general-purpose or special-purpose processor 232 that may be stored on a computer readable storage medium (disk, memory etc) to be executed by such a processor 232.

The processor 232 is configured to read from and write to the memory 234. The processor 232 may also comprise an output interface via which data and/or commands are output by the processor 232 and an input interface via which data and/or commands are input to the processor 232.

The memory 234 stores a computer program 236 comprising computer program instructions (computer program code) that controls the operation of the controller 230 when loaded into the processor 232. The computer program instructions, of the computer program 236, provide the logic and routines that enables the apparatus to perform the methods illustrated in the following Figs. The processor 232 by reading the memory 234 is able to load and execute the computer program 236.

The functionality of the controller 230 is determined by the computer program 236.

A server device 104 and a client device 106 have different functionality and will therefore typically have different computer programs 236.

An administrator device 202 and a user device 212 have common functionality and also different functionality and may have different computer programs 236 or different operational modules of the same computer program 236.

Figure 2B:
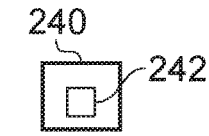
FIG. 2B illustrates a delivery mechanism for a computer program.

As illustrated in FIG. 2B, the computer program 236 may arrive at the controller 230 via any suitable delivery mechanism 240. The delivery mechanism 240 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 236. The delivery mechanism may be a signal configured to reliably transfer the computer program 236. The controller 230 may propagate or transmit the computer program 236 as a computer data signal.

Although the memory 234 is illustrated as a single component/circuitry it may be implemented as one or more separate components/circuitry some or all of which may be integrated/removable and/or may provide permanent/semi-permanent/dynamic/cached storage.

Although the processor 232 is illustrated as a single component/circuitry it may be implemented as one or more separate components/circuitry some or all of which may be integrated/removable. The processor 232 may be a single core or multi-core processor.

References to 'computer-readable storage medium', 'computer program product', 'tangibly embodied computer program' etc. or a 'controller', 'computer', 'processor' 'module' etc. should be understood to encompass not only computers having different architectures such as single/ multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code, module etc. should be understood to encompass software for a programmable processor or firmware such as, for example, the programmable content of a hardware device whether instructions for a processor, or configuration settings for a fixed-function device, gate array or programmable logic device etc.

Figure 2C:
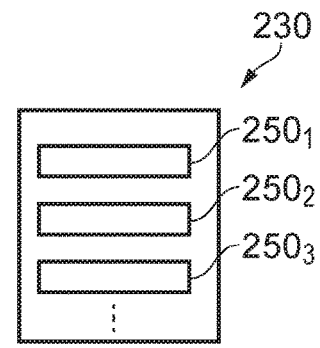
FIG. 2C illustrates a controller implemented as a collection of modules.

FIG. 2C illustrates a controller 230 implemented as a collection of modules 250. The modules 250 may be hardware modules such as programmable processors, specialist circuits, processing circuitry or software modules defined by software for a programmable processor or firmware.

Figure 3:
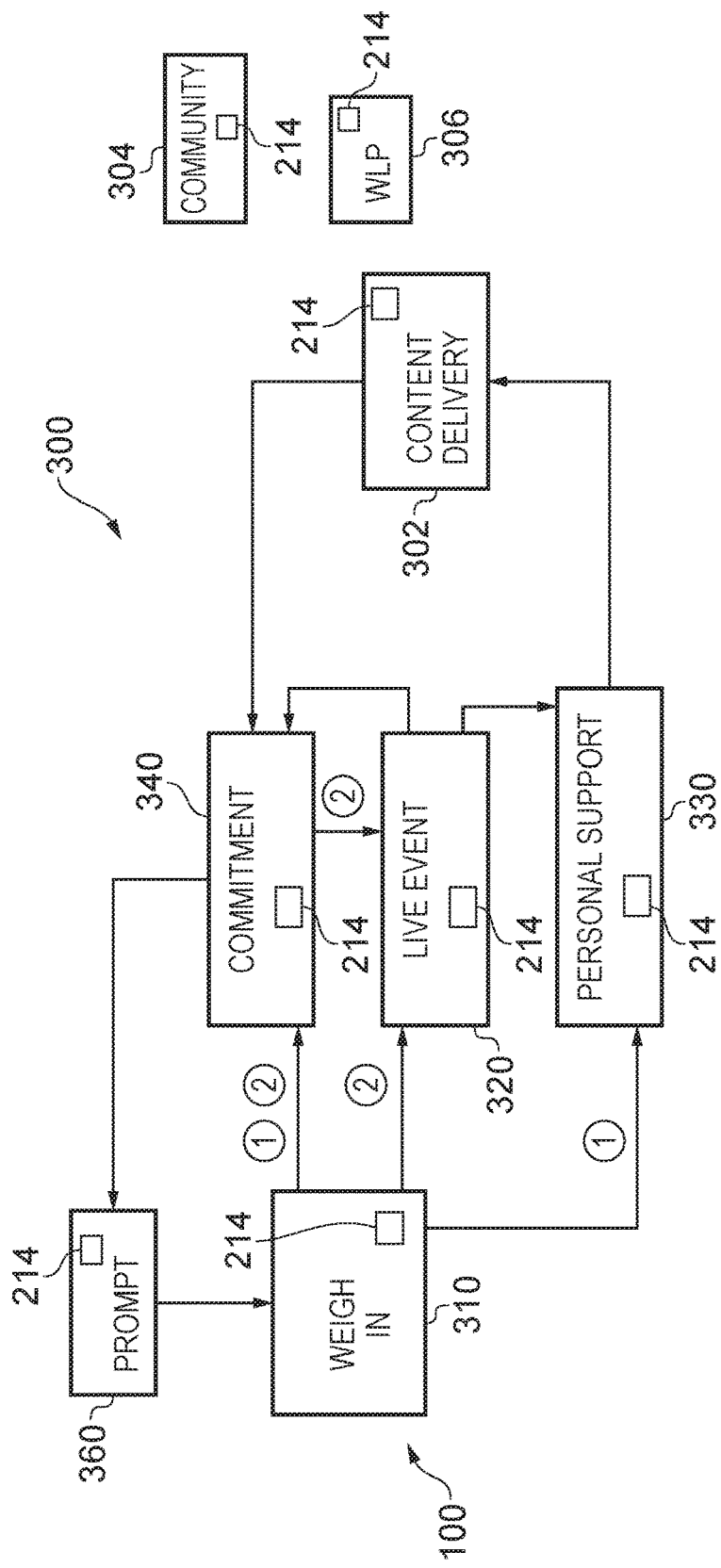
FIG. 3 illustrates a system/method configured to provide a weight-loss service that supports multiple users in losing weight (mass)

FIG. 3 illustrates a system/method 300 configured to provide a weight-loss service that supports multiple users in losing weight (mass).

The process/method 300 illustrated leads a user through a weigh-in process controlled by weigh-in module 310, towards a commitment process controlled by commitment module 340.

The weigh-in process encourages a user to record a user's current weight and mood. The commitment process encourages a user to commit to a weight loss target and at least one user health related behaviour which will help them achieve their weight loss goal.

The system 300 is illustrated as an arrangement of functionally interconnected modules. The modules may be parts of a computer program, separate computer programs, programmed hardware or other means for performing a desired function.

Although the system 300 (and its associated method) will be described in relation to a single user. It should be understood that an independent instantiation of the system/process 300 exists for each user.

Security access protocols ensure that a user only has access to their instantiation of the system/process 300 and does not have access to another user's instantiation of the system/process 300. The security access protocol may mandate authentication of a user before access is granted to a user's instantiation of the system/method 300.

Privacy access protocols ensure that a user controls what information gathered by their instantiation of the system/method 300 is shared with other instantiations of the system/method 300. User-selectable options may be given within the man machine interface 214 of the system/process 300 that allow a user to control sharing of information recorded by the user across instantiations of the system/method 300.

The weigh-in module 310 is configured to provide a man machine interface to a user that is configured to enable the user to input a current weight and to select one of multiple predetermined mood descriptors.

The commitment module 340, when enabled, provides a man machine interface 214 configured to enable recording of a user commitment to a weight loss target and, optionally, to one or more user behaviours.

The path from weigh-in module 310 to commitment module 340 may be direct or may be via one or more user support paths.

A man machine interface 214 provided by the weigh-in module 310 is configured to provide a first user-selectable option that provides direct access to the commitment module 340, and alternate user-selectable option(s) for access to support path(s).

One user support path, in this example, is via a personal support module 330. The personal support module 330 is configured to provide a man machine interface 214 that enables personalized content delivery to be provided by a content delivery module 302 before subsequently enabling commitment module 340. The personalized content is selected based upon at least the user input weight and a selected one of multiple predetermined mood descriptors.

Another optional user support path, in this example, is via a live event module 320. The live event module 320 is configured to provide a man machine interface 214 that enables a real-time communication event (live event).

The support path from the live event path 320 to the commitment module 340 may be direct or may be via one or more user support paths.

A man machine interface 214 provided by the live event module 320 may be configured to provide a first user-selectable option that provides direct access to the commitment module 340, and an alternate user-selectable option for access to a new user support path via the personal support module 340.

The personal support module 330 provides a man machine interface 214 that enables personalized content delivery to be provided by a content delivery module 302 based upon at least the user input weight and a selected one of multiple predetermined mood descriptors before subsequently enabling commitment module 340.

Additional assistance modules may also be provided. The different modules illustrated provide, where they provide a man machine interface 214, different variants of the man machine user interface 214 which had different content and different control options and provides different functionality.

A prompt module 360 may enable a prompt to be sent to a user reminding them to weigh-in and optionally providing a user-selectable option to enable the weigh-in module 310.

The weight loss planner (WLP) module 306 is configured to enable Food Optimising™. The weight loss planner (WLP) module 306 is configured to enable a user to plan & record consumption of Free Foods™, Healthy Extras™ and Syns™ and configured to enable a user to plan and record exercise. The user may also make a free text journal entry and/or indicate a current mood.

The recording of consumption of Free Foods™, Healthy Extras™ and Syns™ may be recorded by selecting options via drop-down lists or via search engines.

An automatic alert may be triggered when a daily personal limit is reached for Syns™ or a universal limit is reached Healthy Extras™.

A Free Food™ option/alternative may be provided in response to selecting or searching for a specific Syns food.

The Weight loss planner is based on Food Optimizing™. Food Optimizing™ is an approach to food consumption based upon the classification of food into three distinct groups and consuming the food in each group differently.

The first group is 'Free Foods™'. An unlimited amount of these foods may be consumed by a user. There is no need to weigh or count.

The second group is 'Healthy Extras™'. These foods are beneficial is moderation and should be consumed in moderation (measured portions per day). The limits on consumption of Healthy Extras™ are: two portions of Healthy Extras™ should be consumed from the 'a' list per day and one from the 'b' list per day.

The third group is 'Syns™'. These foods maybe consumed but strictly in moderation. Each user has a Syn™ allowance (limit) per day which they can spend as they desire. The allowance (limit) is dependent upon a user's weight and sex.

Examples of Free Foods™ are:
Most unprocessed fresh fruit
Most vegetables (fresh, canned, frozen, pickled in vinegar) cooked without fat
Most fresh and frozen fish and seafood cooked without fat
Very lean unprocessed meat and poultry cooked without fat
Eggs cooked without fat or fried with low calorie cooking spray
Fat-free plain yogurt (inc Greek style), plain cottage cheese, plain quark.
Textured vegetable protein, soy protein, unflavoured/unsmoked tofu
Dried pasta & noodles
Rice
Buckwheat, Bulgar wheat, couscous, Farro, Millet, pearl barley, *quinoa*
Canned spaghetti/pasta shapes in tomato sauce without meat
Pulses (fresh, frozen, canned in water)

Examples of Healthy Extras™ (a) are:
Listed milk portions (specified)
Cheese portions (specified)

Examples of Healthy Extras™ (b) are:
Listed cereals portions (specified)
Bread portions
Crackers and crispbread portions
Cereal bars (portions)
Dried, canned, cooked fruit (portions)
Soups (portions)
Nuts and seeds (portions)

Examples of Syns™—anything that is not a Free Food™ or Healthy Extra™ is a Syn™ and has a Syn™ value specified in a look-up table.

The community module 304 may be a web-site hosting a discussion forum for a community of users, where a user can ask and answer questions. The community may be moderated.

Although the content delivery module 302 is described above as operating under control of the personal support module 330, the content delivery module 302 may also deliver content according to a schedule. For example, a multi-week induction program may be orchestrated by delivering content regularly from the content delivery module 302.

Independent Weight-In (Journey 1)

Figure 4A:
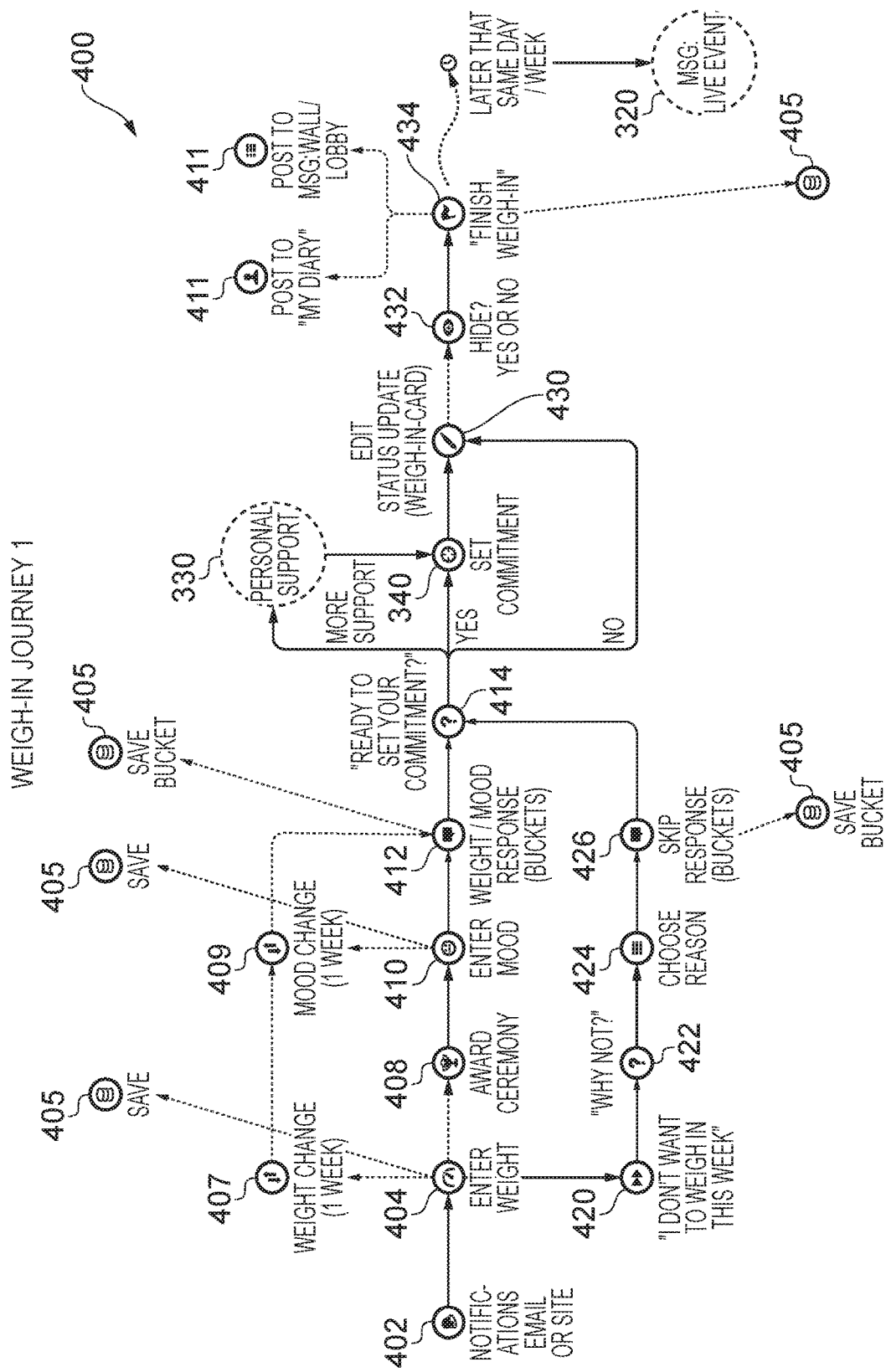
FIG. 4A illustrates a system (or process) for controlling a weigh-in procedure independently of a live event and FIG. 4B illustrates a system (or process) for controlling a weigh-in procedure as a pre-cursor step before a live event.

FIG. 4A illustrates a system (or process) 400 for controlling a weigh-in procedure independently of a live event in response to a prompt.

The prompt module 360 generates a prompt 402 which is sent to the user. The prompt 402 may be a prompt, such as a pop-up icon, within the man machine interface 214 of the user device 212 (FIG. 5A) or a notice at a home screen within the man machine interface 214 of the user device 212 (FIG. 5B) or may be a notification or communication sent via a different interface such as an email application, calendar program etc.

The prompt 402 includes text that reminds the user 120 of the user device 212 that they should input a current weight (mass) to the system via the man machine interface (MMI) 214.

The weigh-in module 310 provides a MMI 214 that enables the user to input 404 his/her current weight. The current weight may be saved 405 to a memory.

Figure 7A:
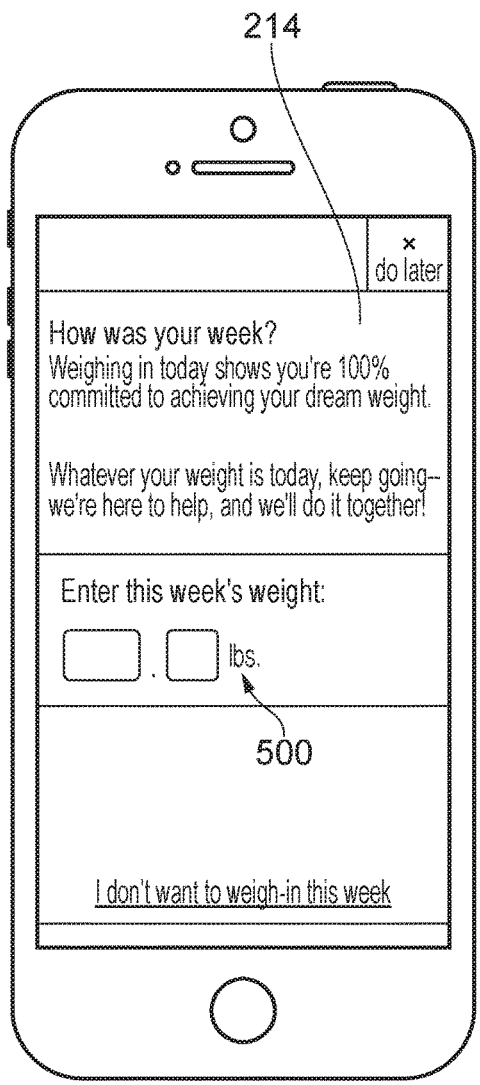
Figure 7B:
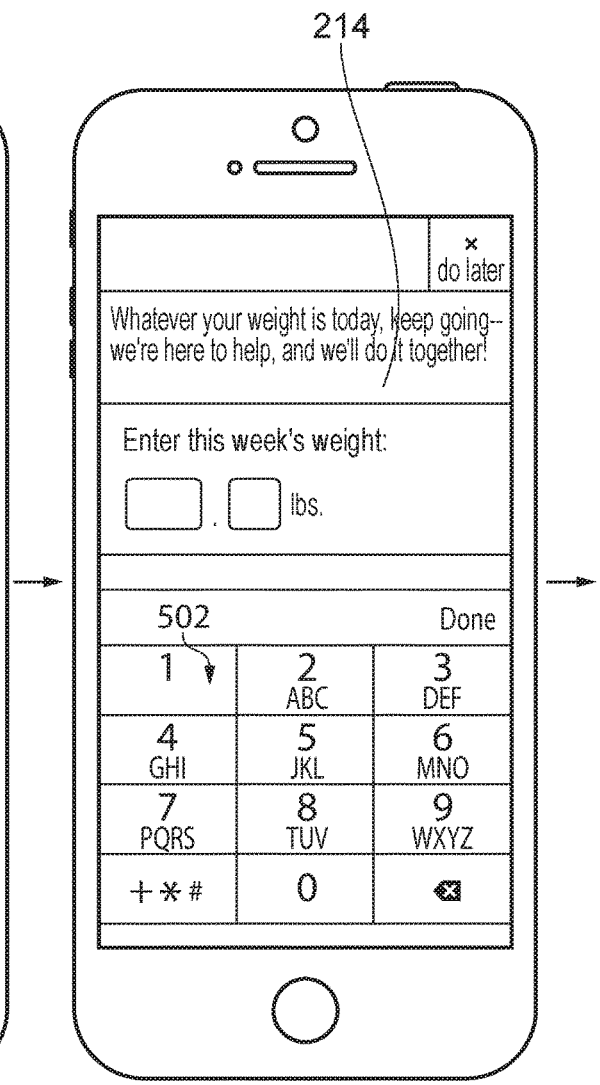
Figure 7C:
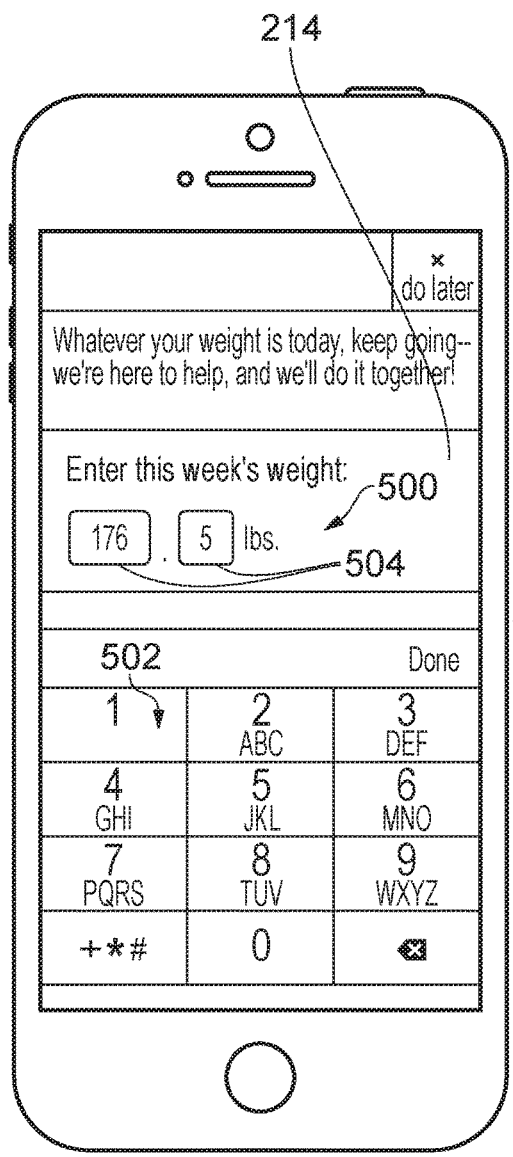
Figure 7D:
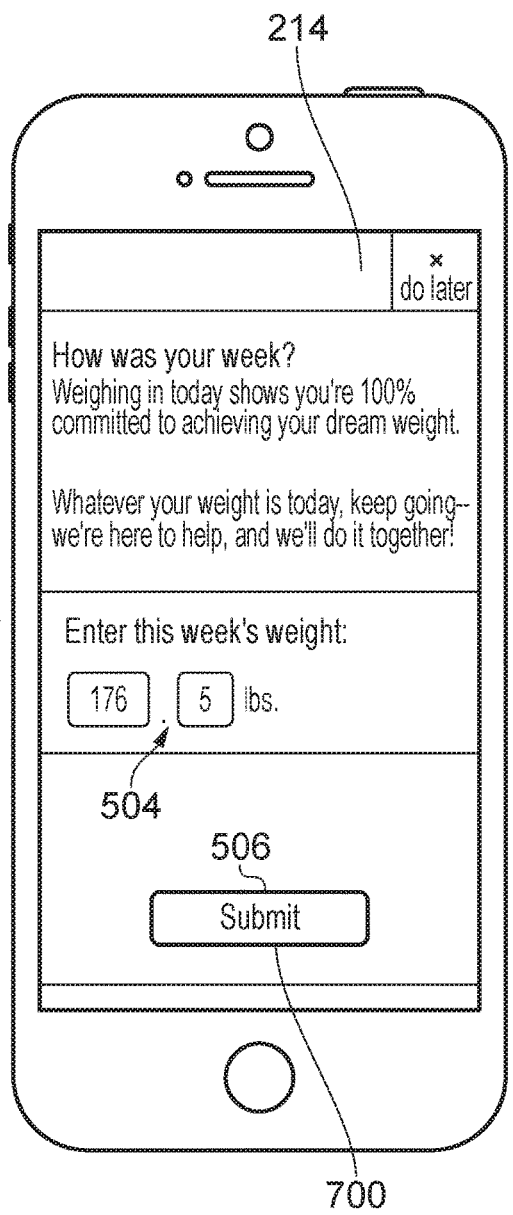

In FIG. 7A an input field 500 for inputting a user weight is empty. If the user selects the input field 500, a numeric keyboard 502 is automatically provided in the MMI 214 adjacent the input field 500 (FIG. 7B). The user uses the numeric keyboard 502 to enter a weight 504 in the input field 500 (FIG. 7C). If the user selects the 'done' key in the numeric keyboard 502 the MMI 214 redisplays the input weight 504 with a note of encouragement and presents a user-selectable option 506 to submit the input weight 504 for use and storage (FIG. 7D).

Figure 8:

The weigh-in module 310 determines whether or not the user should win an award. If an award is won it is presented visually via the MMI 214 (FIG. 8). An award or different awards may, for example, be won for losing weight, for consistently losing weight, for achieving a gross weight loss, or for achieving a weight loss target, for example.

Figure 9:
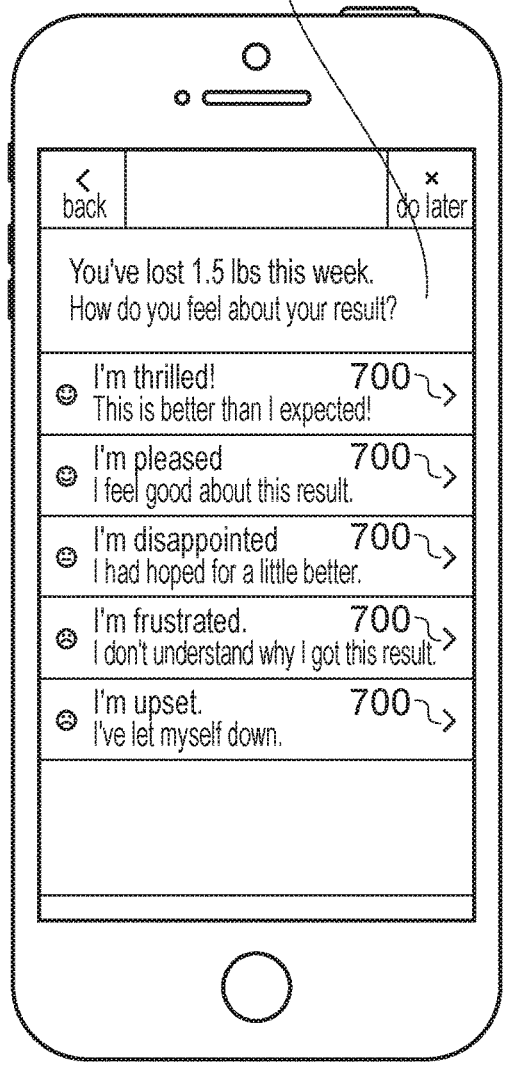

The weigh-in module 310 provides a MMI 214 that enables the user to input 410 an indication of his/her current mood (FIG. 9). The mood indication may be saved 405 to a memory.

The weigh-in module 310 determines 412 a weight-mood state for the user based upon at least the current weight and the current mood.

The weight-mood state for the user may additionally be based upon at least the change in weight determined 407 by the weigh-in module 310 and/or a change in mood determined 409 by the weigh-in module 310.

A change in weight/mood may be determined since the last recorded weight/mood or from a recorded weight/mood closest to a specific duration before the current time (e.g. 1 week).

The weight-mood state for the user may be saved 405 to memory.

Figure 10:
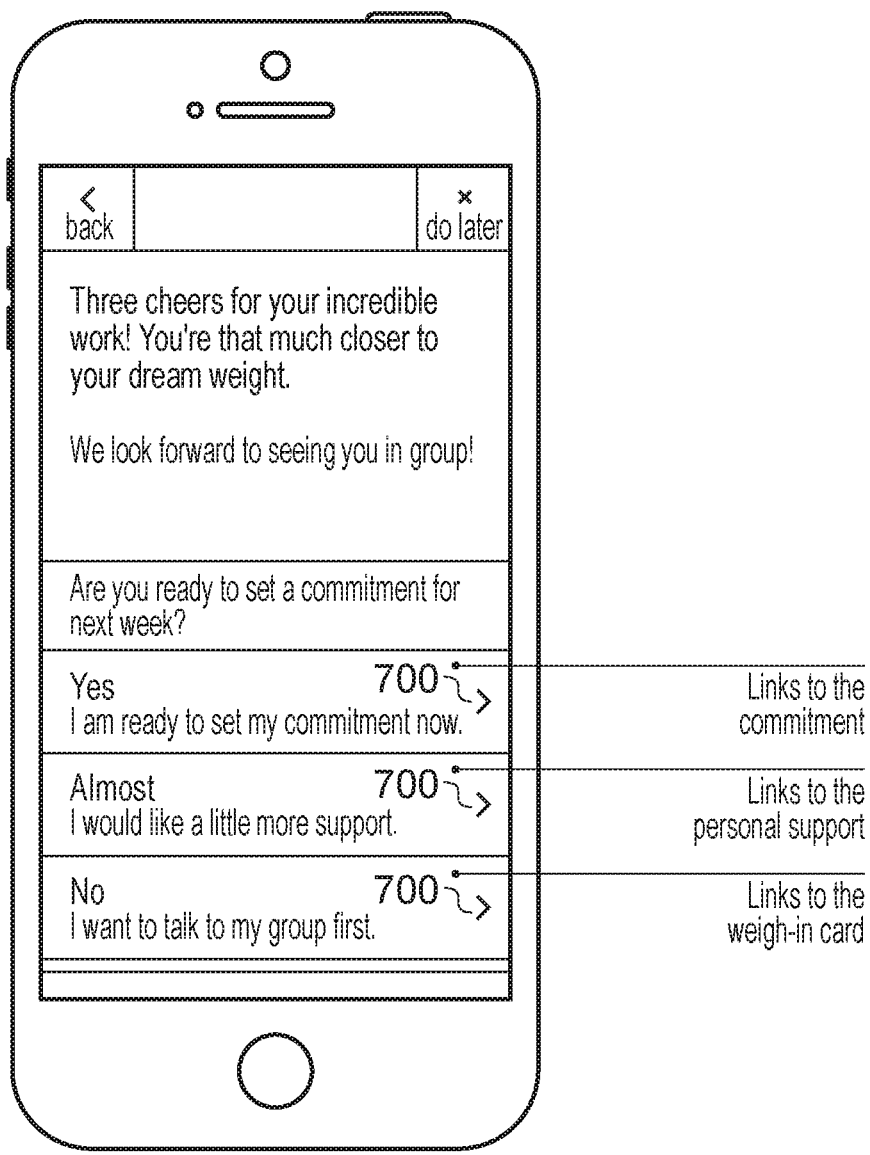

In this example, but not necessarily all examples, the weigh-in module 310 provides a MMI 214 that enables 414 the user to select one of three user-selectable options (FIG. 10)—
(i) do not set a commitment
(ii) set a commitment
(iii) defer setting a commitment until after receiving personal support In other examples, the option (i) is absent and is replaced by the option:
(iv) talk to your group first in order to set a commitment.

If option (i) is selected the commitment module 340 is not used.

If option (ii) is selected the weigh-in module 310 enables the commitment module 340.

The commitment module 340, when enabled, provides a man machine interface 214 configured to enable recording of a user commitment to a weight loss target and, optionally, to one or more user behaviours.

If option (iii) is selected the weigh-in module 310 enables the personal support module 330.

The personal support module 330 is configured to provide a man machine interface 214 that automatically enables automatic personalized content delivery to be provided by a content delivery module 302 before subsequently enabling commitment module 340. The personalized content is selected automatically based upon at least the user input weight and a selected ones of multiple predetermined mood descriptors.

Figure 17A:
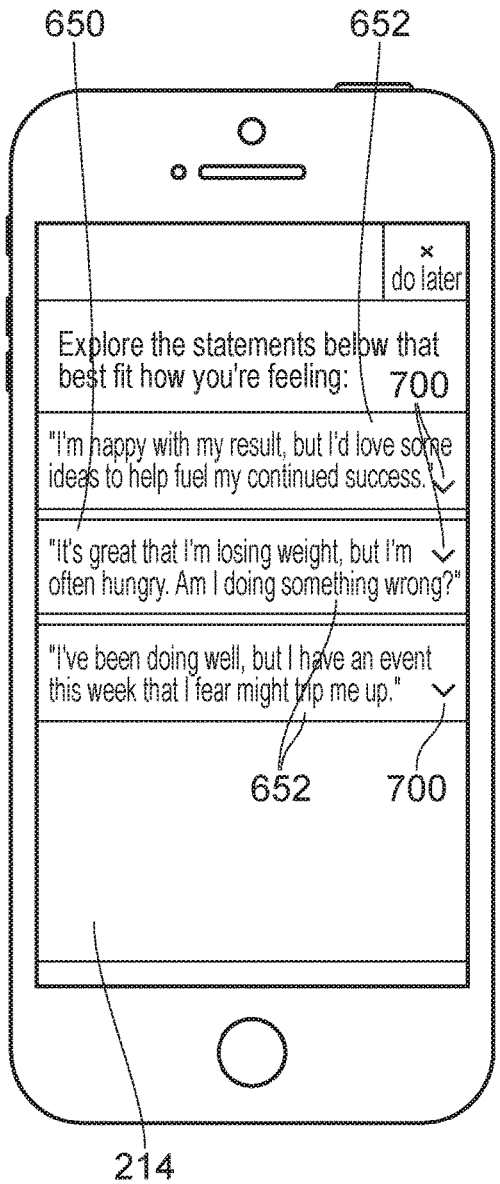
Figure 17B:
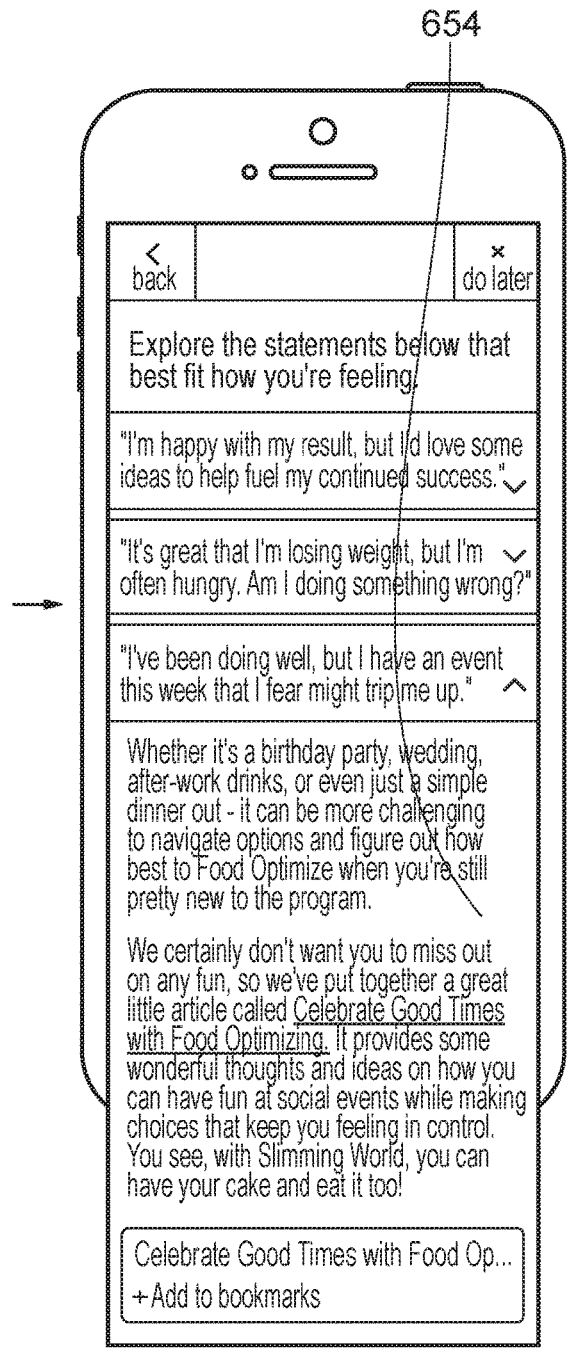
Figure 17C:
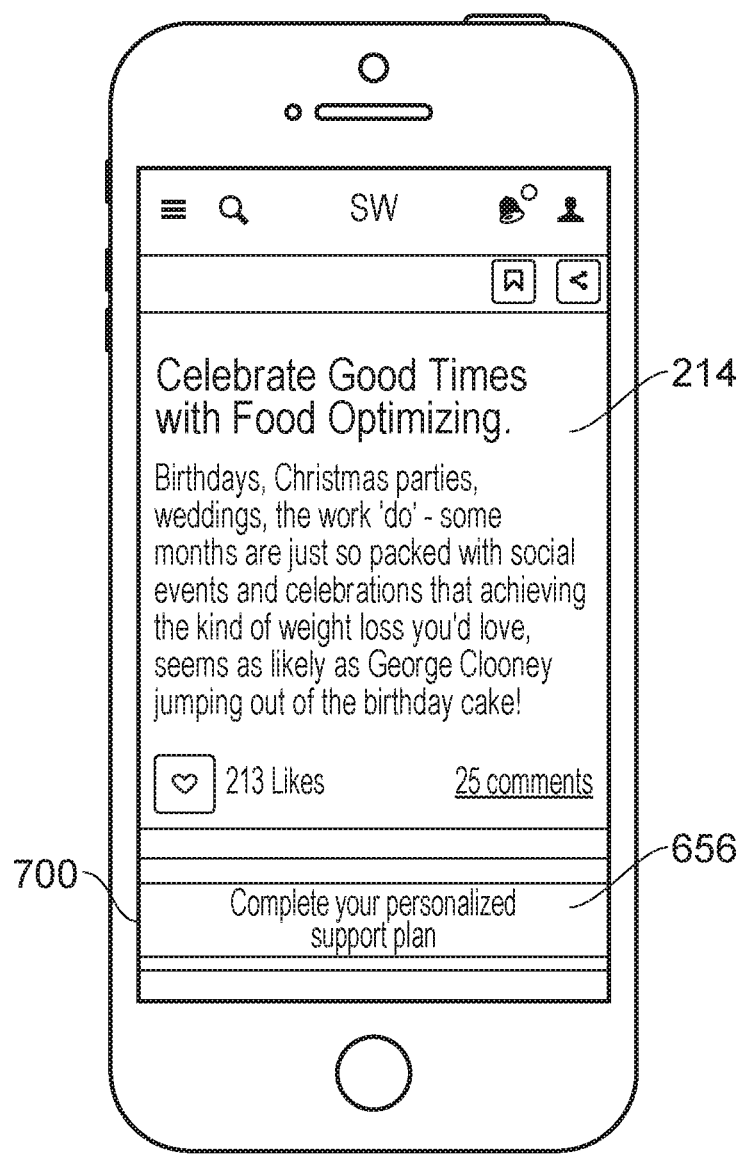

FIG. 17A illustrates an example of a man machine interface 214 provided by the content delivery module 302. The man machine interface 214 presents personalised content 650 to the user. In this example, the personalised content 650 is presented via a series of statements 652. The user may select a statement 652 that is relevant to them at this time. As illustrated in the example of FIG. 17B, when a particular statement 652 is selected, the man machine interface 214 presents additional personalised content 654 relevant to the statement 652 selected. As illustrated in the example of FIG. 17C, the man machine interface 214 presents a user-selectable option 656 to proceed to the commitment module 340.

The personal support module 330 therefore indirectly enables the commitment module 340. The commitment module 340, when enabled, provides a man machine interface 214 configured to enable recording of a user commitment to a weight loss target and, optionally, to one or more user behaviours.

Figure 12:
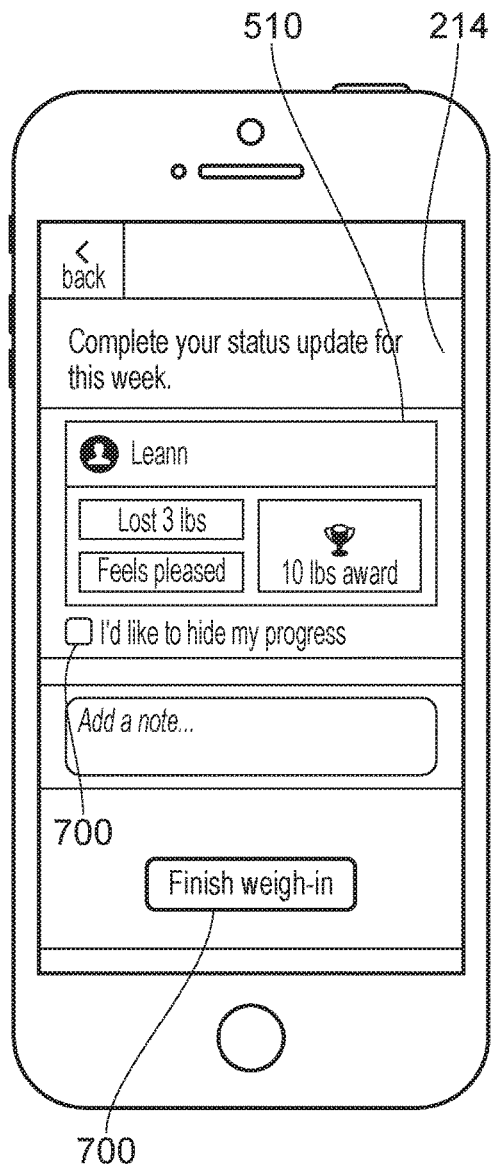

After the commitment module 340 has recorded a user commitment to a weight loss target and, optionally, a user commitment to one or more user behaviours, the weigh-in module 310 may terminate the weigh-in process by providing a MMI 214 that enables the user to edit 430 a user weigh-in card 510, select 432 publication/privacy options for the weigh-in card 510 and finish 434 the weigh-in process (FIG. 12).

FIGS. 16A-16D illustrate an example of a man machine interface 214 provided by the commitment module 340 and configured to enable a user to record a user commitment to a weight loss target.

Figure 16A:
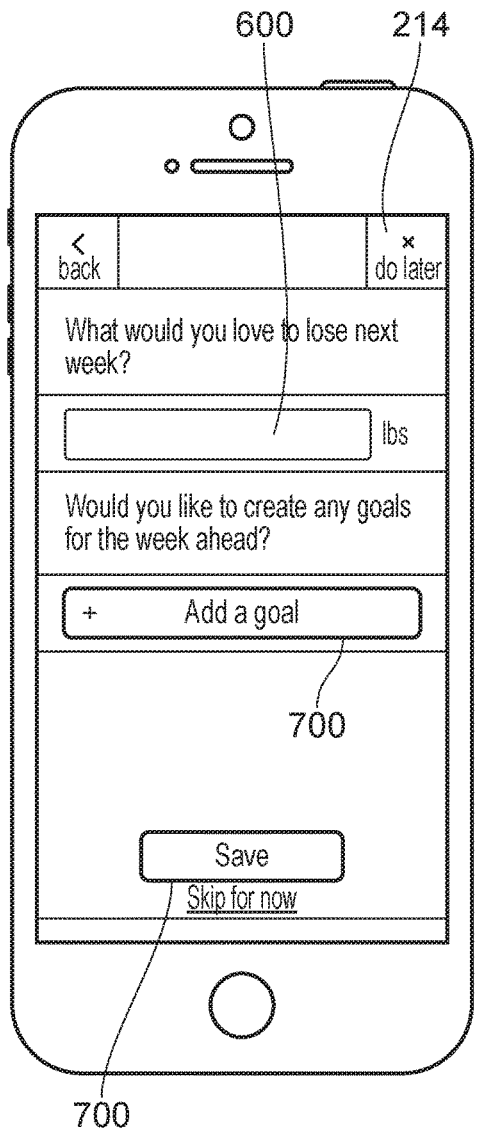
Figure 16B:
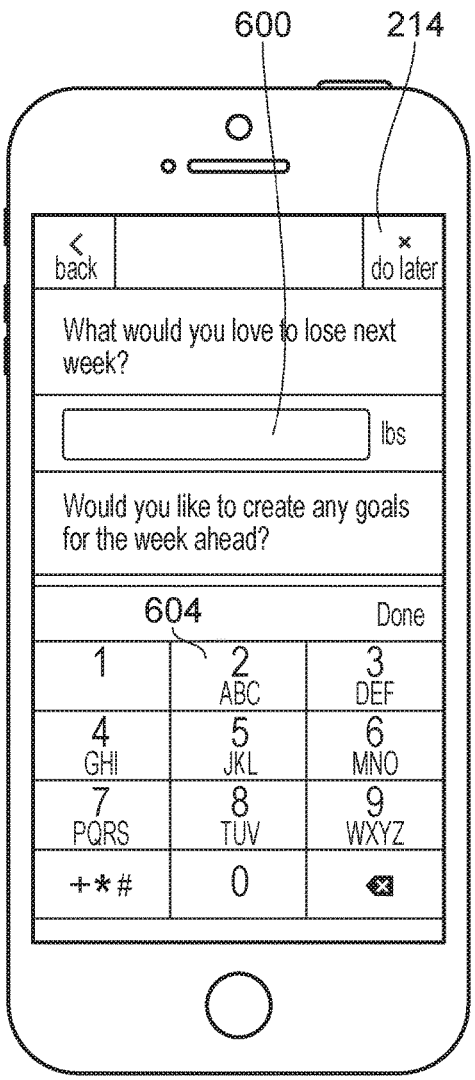
Figure 16C:
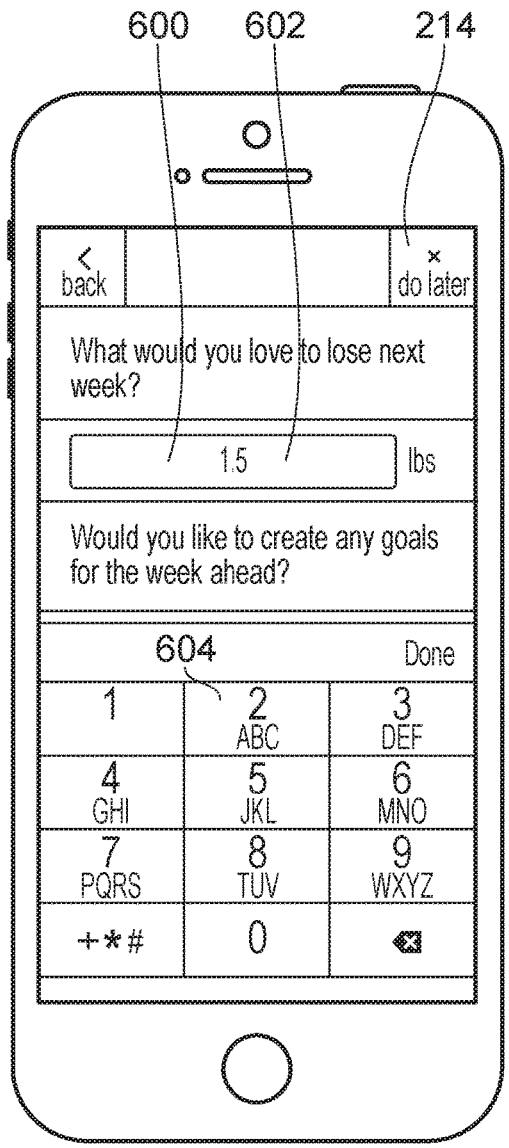
Figure 16D:
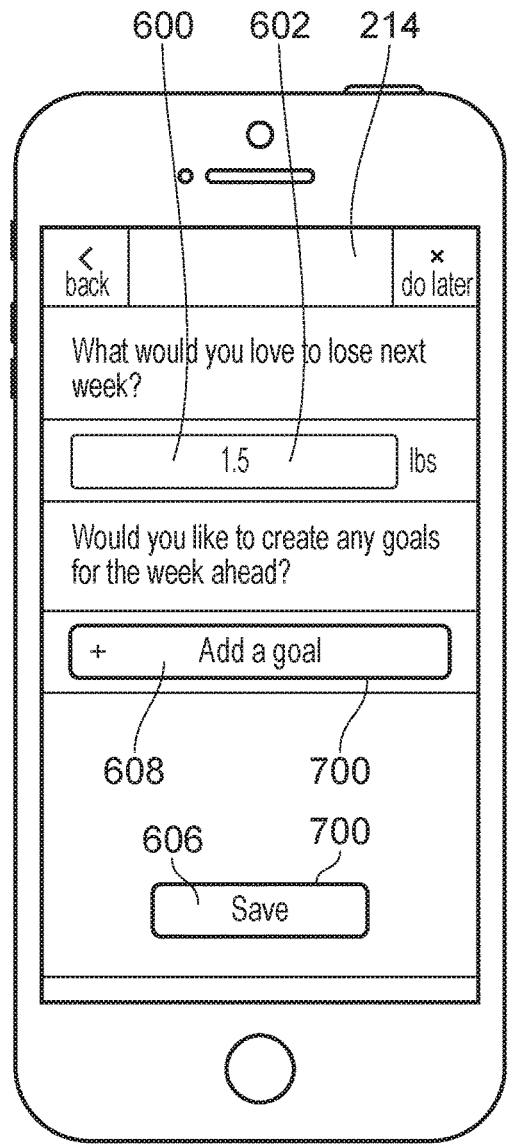

In FIG. 16A an input field 600 for inputting a weight loss target 602 is empty. If the user selects the input field 600, a numeric keyboard 604 is automatically provided in the MMI 214 adjacent the input field 600 (FIG. 16B). The user uses the numeric keyboard 604 to enter a weight loss target 602 in the input field 600 (FIG. 16C). If the user selects the 'done' key in the keyboard 604 the MMI 214 redisplays the weight loss target 602 and presents an option 606 to save the weight loss target 602 (and exit) and an alternate option to 608 to record one or more commitments to user behaviour.

FIGS. 16E-16H illustrate an example of a man machine interface 214 provided by the commitment module 340 and configured to enable a user to record a user commitment to user behaviour.

Figure 16E:
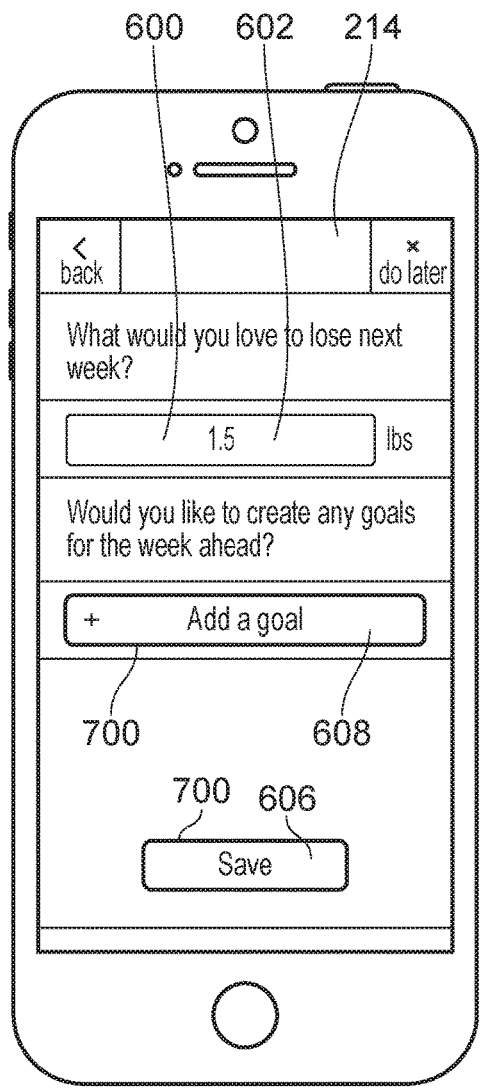
Figure 16F:
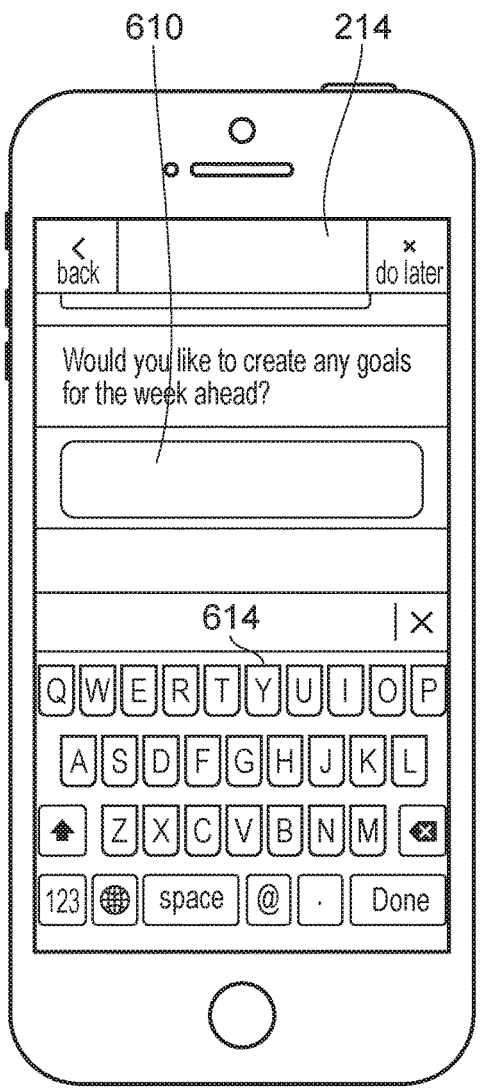
Figure 16G:
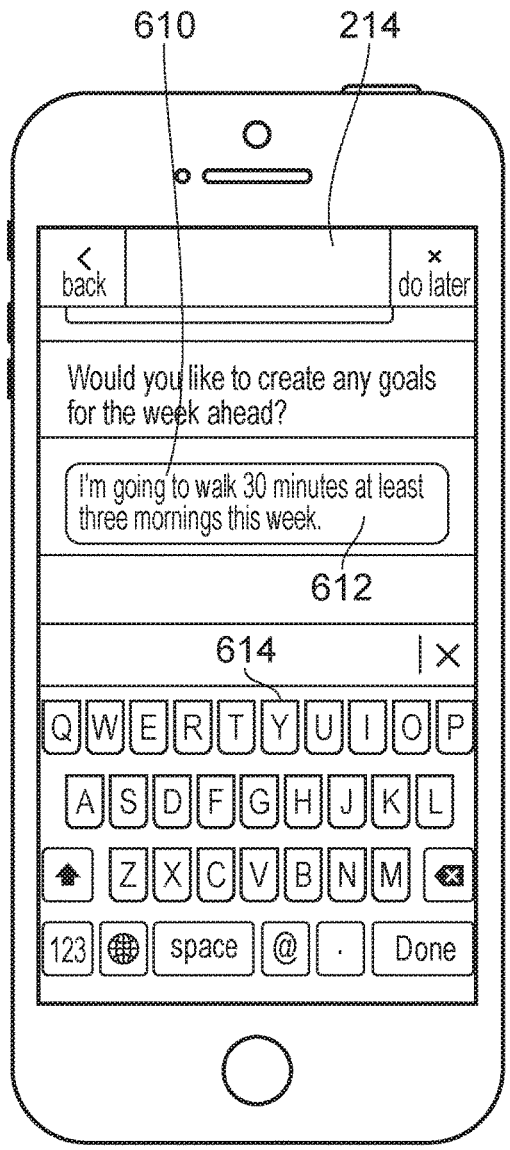
Figure 16H:
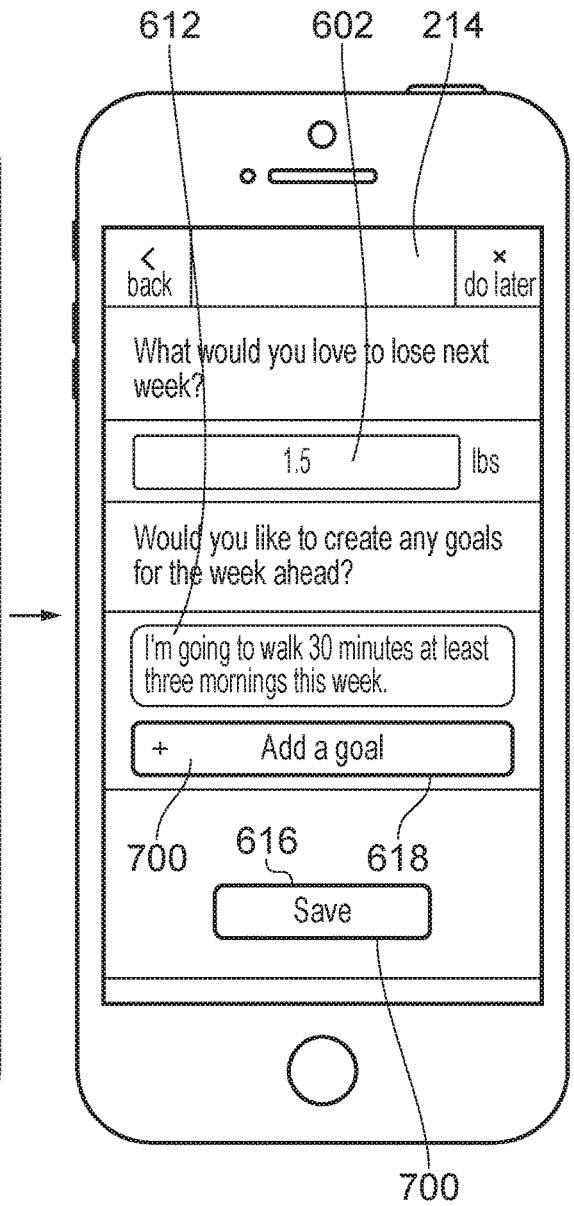

FIG. 16E is the same as FIG. 16A. FIGS. 16F-16H illustrate the man machine interface 214 if the option 608 is selected. In FIG. 16F an input field 610 for inputting text describing a behaviour commitment 612 is empty. If the user selects the input field 610, an alphabetic keyboard 614 is automatically provided in the MMI 214 adjacent the input field 610 (FIG. 16F). The user uses the keyboard 614 to enter text defining the user's behaviour commitment 612 in the input field 610 (FIG. 16G). If the user selects the 'done' key in the keyboard 614 the MMI 214 redisplays the user's behaviour commitment 612 and presents an option 616 to save the user's behaviour commitment 612 (and exit) and an alternate option to 618 to record one or more additional user behaviour commitments.

Figure 13:
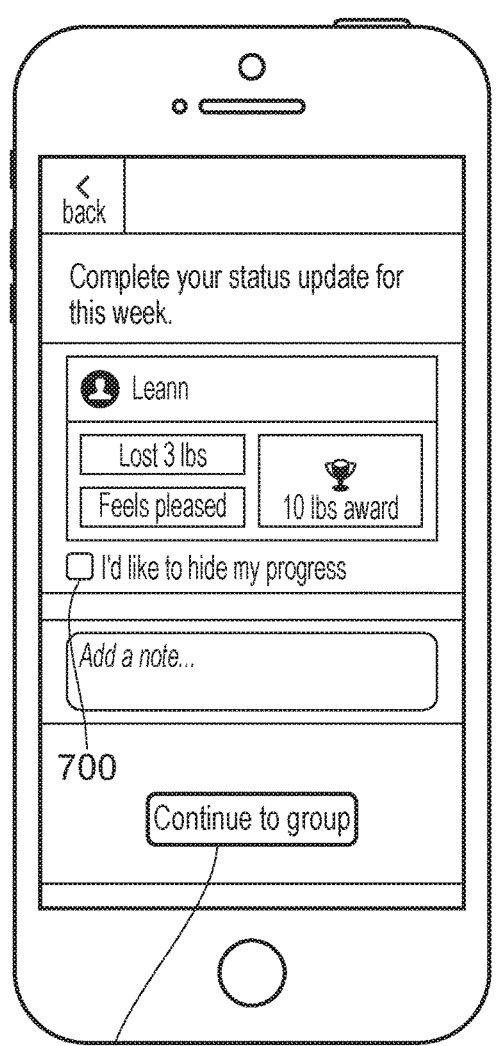

Returning to FIG. 4A, after the commitment module 340 has recorded a user commitment to a weight loss target and, optionally, a user commitment to one or more user behaviours, the weigh-in module 310 may terminate the weigh-in process by providing a MMI 214 that enables the user to edit 430 a user weigh-in card 510, select 432 publication/privacy options for the weigh-in card 510 and finish 434 the weigh-in process (FIG. 13).

FIGS. 14A-14D illustrate an example of how a user weigh-in card 510 may be edited.

Figure 14A:
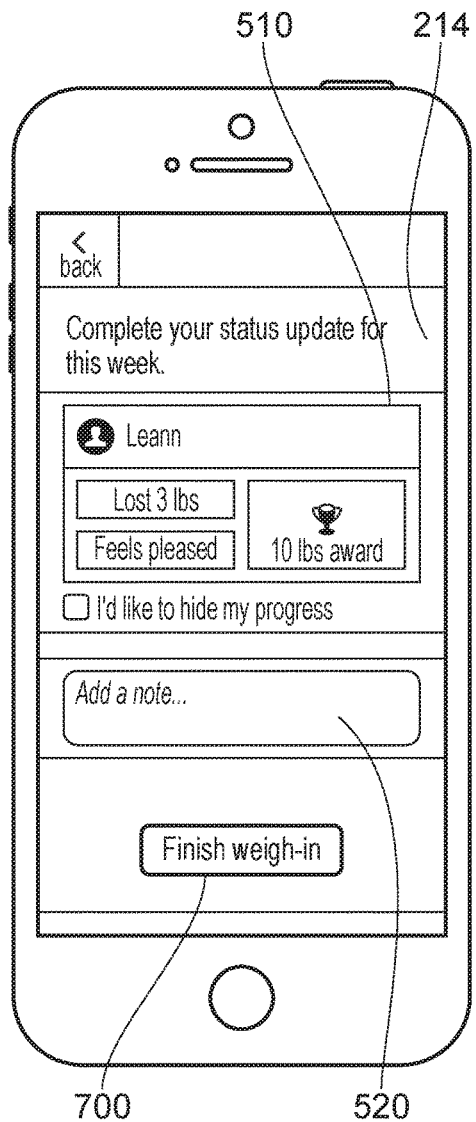
Figure 14B:
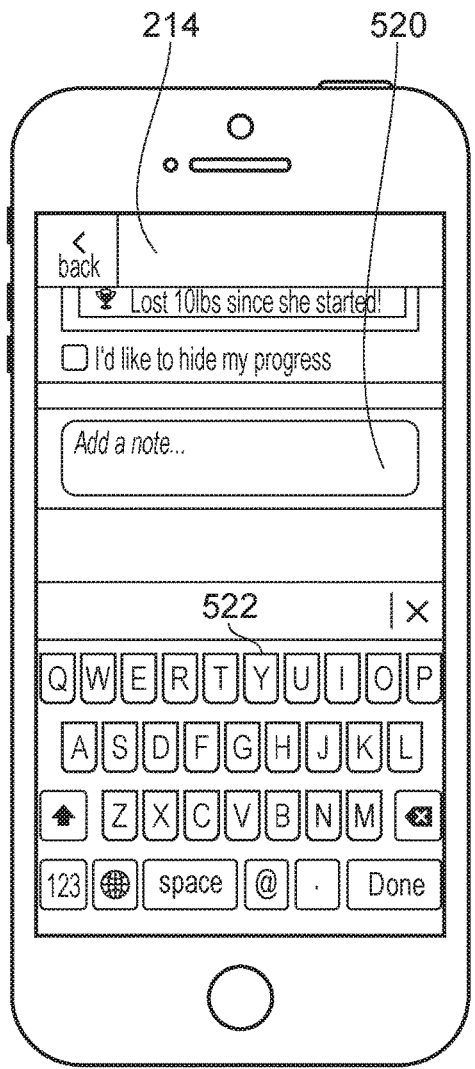
Figures 14C, 14D:
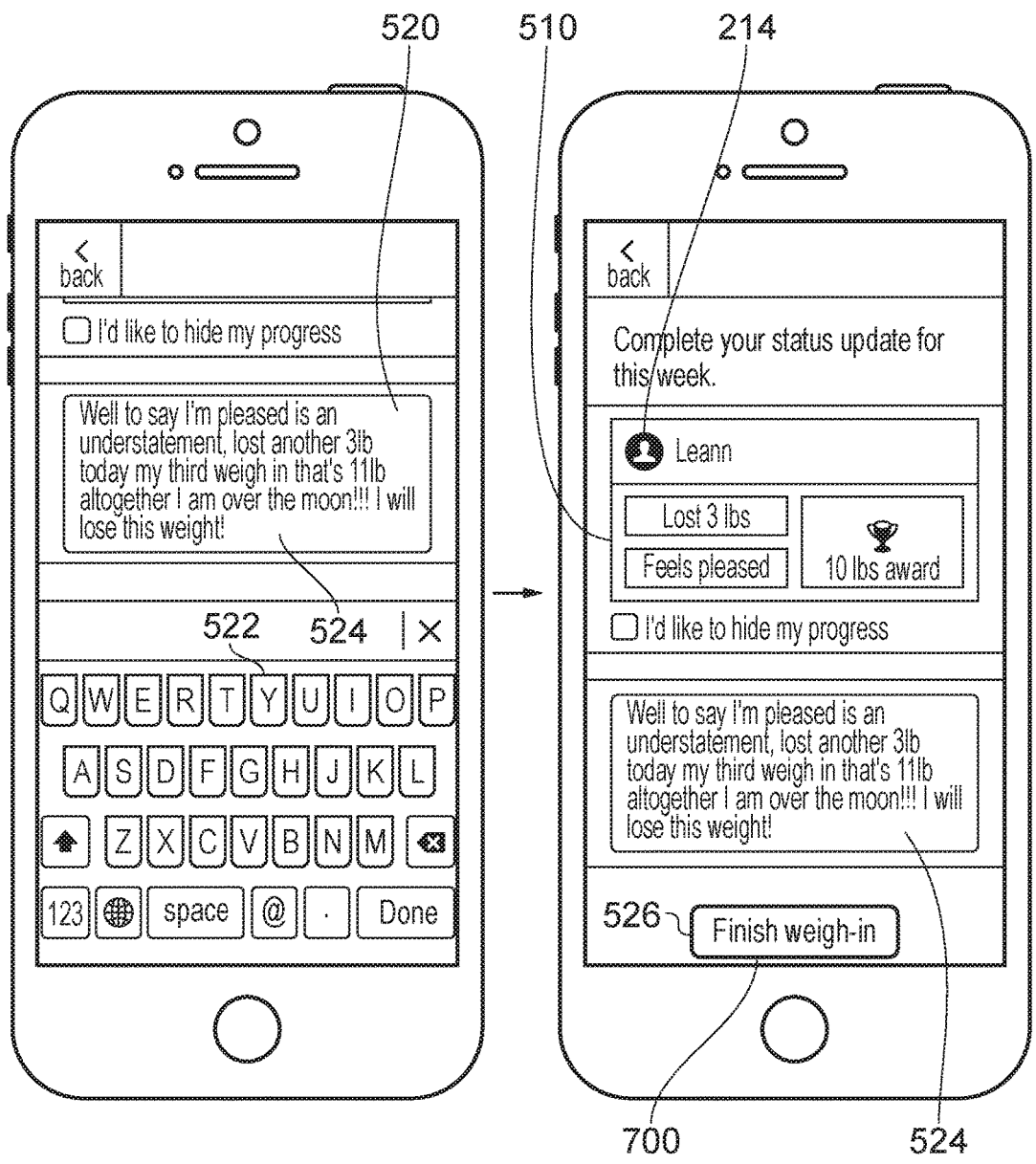

In FIG. 14A an input field 520 for inputting a user note is empty. If the user selects the input field 520, an alphabetic keyboard 522 is automatically provided in the MMI 214 adjacent the input field 520 (FIG. 14B). The user uses the alphabetic keyboard 522 to enter text 524 in the input field 520 (FIG. 14C). If the user selects the 'done' key in the keyboard 522 the MMI 214 redisplays the weigh-in card 510 with the user's note 524 attached and presents an option 526 to submit the updated weigh-in card 510 for use and storage (FIG. 14D).

Finishing the weigh-in process causes the weigh-in card 510 and privacy settings to be saved 405 in a memory. The privacy settings are used to control whether and how the weigh-in card 510 is published. It may, for example, be published privately and/or publicly.

In this example, but not necessarily all examples, the weigh-in module 310 provides a MMI 214 that enables the user to skip 420 weight input and/or mood input.

Figure 15:
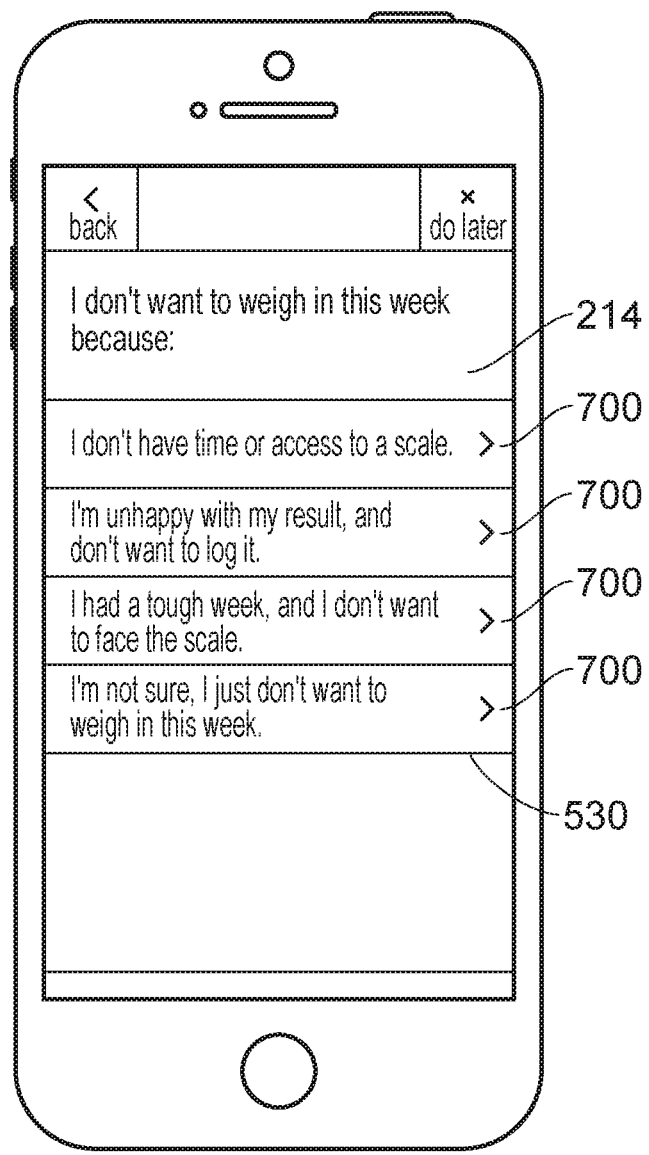

The weigh-in module 310 provides a MMI 214 that queries 422 the user why they do not wish to enter a weight and/or mood and provides 424 a list 530 of predetermined reasons for user selection (FIG. 15). The selected predetermined reason and the fact that a weigh-in has been fully or partially skipped is recorded 405 in a memory.

Weigh-In Before Live Event (Journey 2)

Figure 4B:
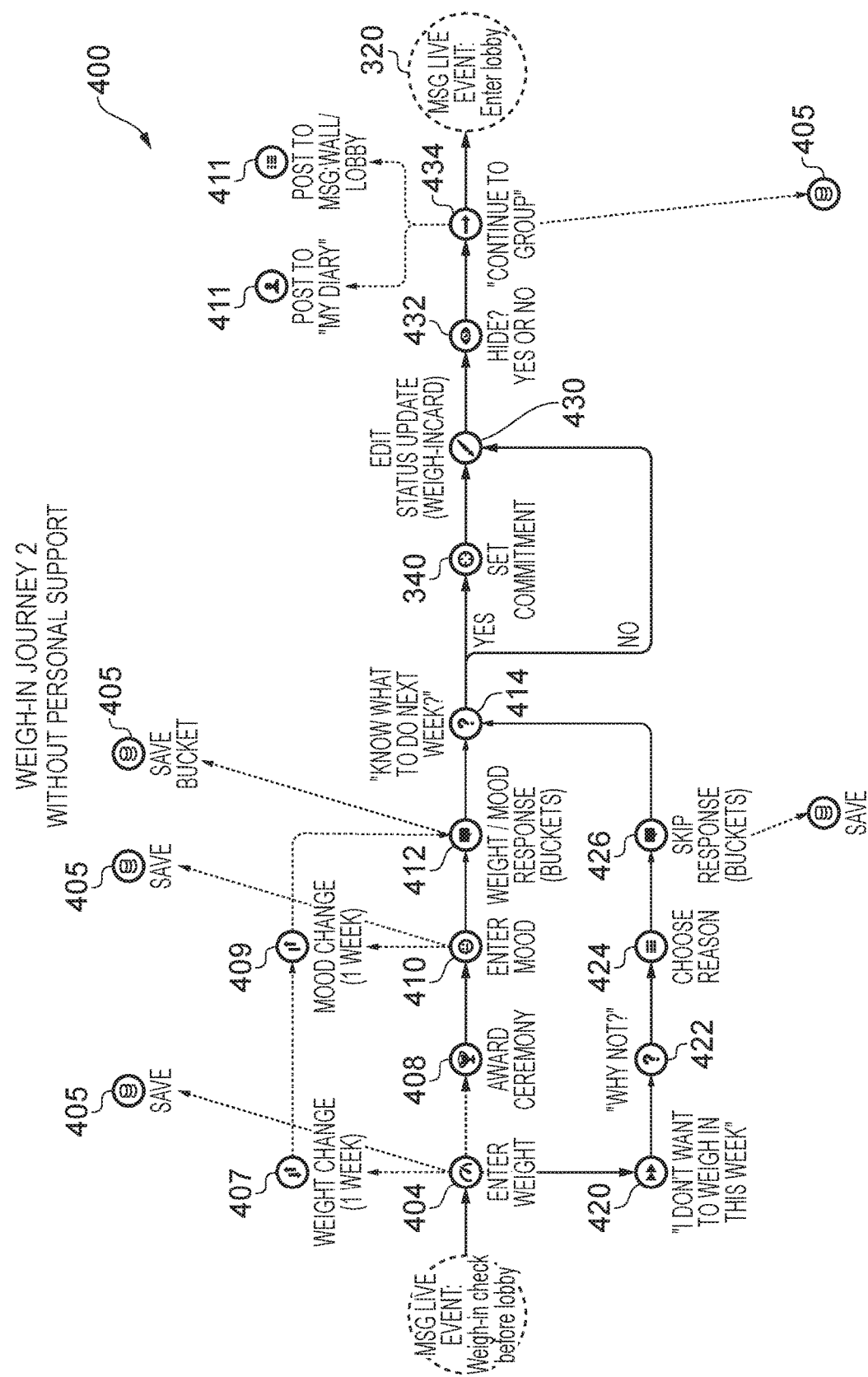

FIG. 4B illustrates a system (or process) 400 for controlling a weigh-in procedure as a pre-cursor step before a live event.

Figure 6:
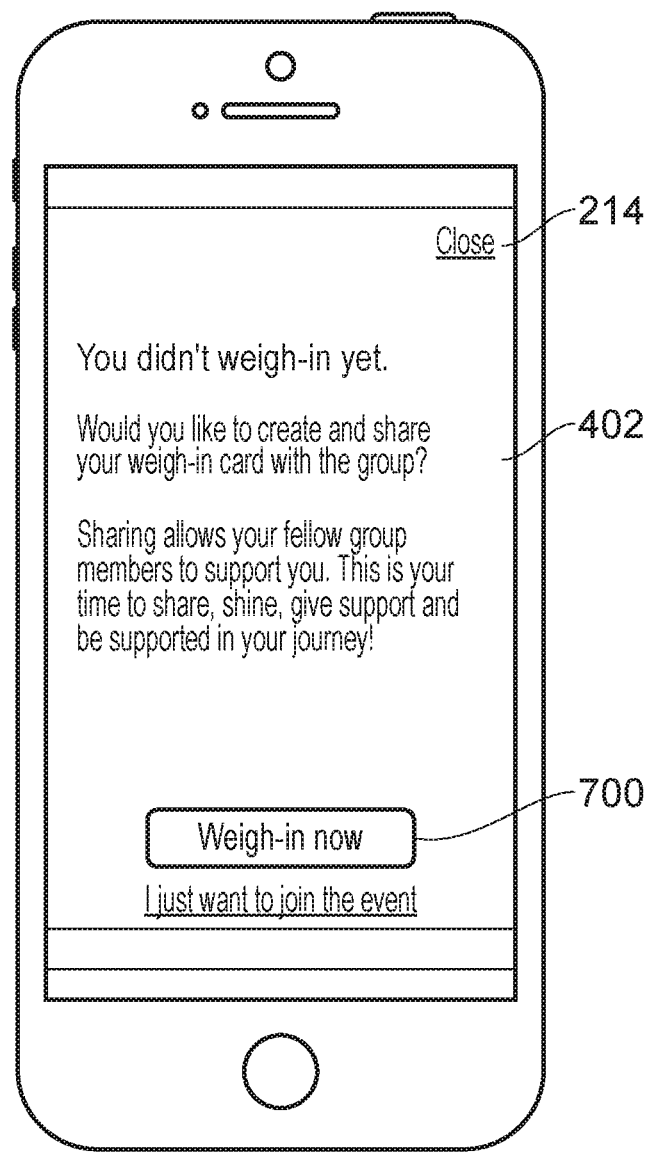

The prompt module 360 generates a prompt 402 which is sent to the user. However, the format of the prompt may be different (FIG. 6) because it is a preliminary step before the live event.

Figure 11:
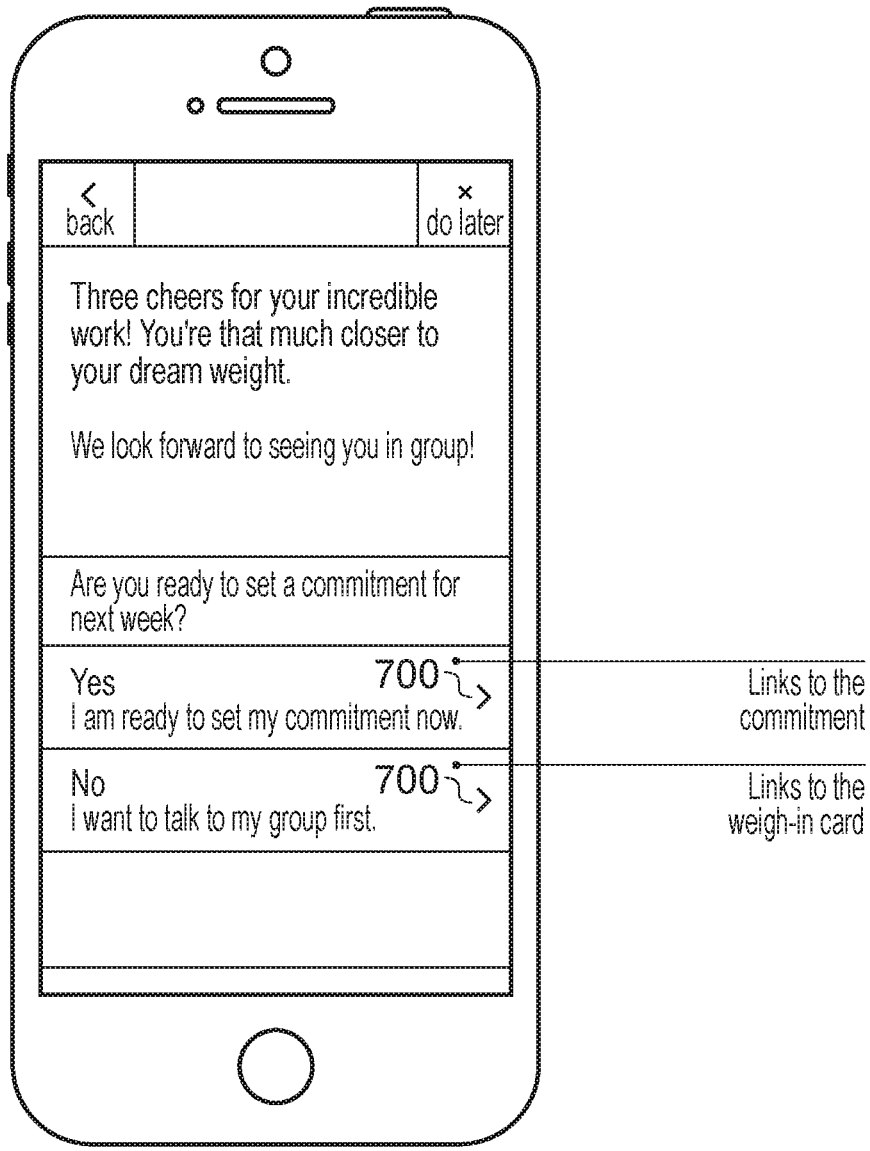

The system (or process) 400 of FIG. 4B differs from that illustrated in FIG. 4A in that it occurs immediately before the live event and in that the weigh-in module 310 provides a MMI 214 that enables 414 the user to select one of two (not three) user-selectable options (FIG. 11)—
(i) do not set a commitment
(ii) set a commitment There is no immediate option to defer setting a commitment until after receiving personal support. However, the live event itself potentially defers setting a commitment until after receiving personal support because personal support is an available option at the end of the live event before setting a commitment.

It should be noted that in FIGS. 5A-17C a user selectable option is sometime indicated by a user selectable widget 700.

The system 100 determines a change in weight since the last recorded weight or from a weight closest to a specific duration before the current time (e.g. 1 week).

Referring back to FIG. 3 and also FIG. 4A or 4B and at least some of FIGS. 5-17E, it will be appreciated that the system 100 (and/or system/process 300) cause, for each one of a plurality of users:

providing a man machine interface 214 configured to enable a user to input a current weight and to select one of multiple predetermined mood descriptors (e.g. FIG. 7-9);

providing a man machine interface 214 configured to provide at least a first user-selectable option and a second user-selectable option (e.g. FIG. 3, FIG. 4A/4B, FIG. 10-11), wherein the first user-selectable option when selected causes a man machine interface 214 to be provided by the commitment module 340 that enables recording of a user commitment to a weight loss target and at least one user behaviour, (e.g. FIG. 3, FIG. 4A/4B, FIG. 16), and wherein the second option when selected causes a man machine interface 214 to be provided by the personal support module 330 (e.g. FIG. 3, FIG. 4A, FIG. 17A-17C) that enables personalized content delivery to be provided by the content delivery module 302 (e.g. FIG. 3) based upon at least the user input weight (e.g. FIGS. 7A-7D) and one or more selected predetermined mood descriptors (e.g. FIG. 9), before subsequently enabling commitment module 340 to provide a man machine interface 214 (e.g. FIG. 14A-14D) configured to enable recording of a user commitment to a weight loss target and at least one behaviour.

The man machine interface 214 (e.g. FIG. 4A, FIG. 10) may additionally be configured to provide not only the first user-selectable option and the second user-selectable option, but also a third user-selectable option, wherein the third user-selectable option when selected causes a man machine interface 214 to be provided by the live event module 320 that enables a real-time communication event (Live Event), before subsequently enabling commitment module 340 to provide a man machine interface 214 (e.g. FIG. 14A-14D) configured to enable recording of a user commitment to a weight loss target and at least one user behaviour.

Operation of one example of the personal support module 330 and its interaction with the content delivery module 302 will be now described.

The personal support module 330 provides man machine interface 214 that enables automatic personalized content delivery based upon at least the user input weight and selected one of the multiple predetermined mood descriptors determined at the weigh-in module 310.

The content delivered is selected automatically as a function F of mood(t), weight(t), weight loss target WLT(t), experience(t).

The collection mood(t), weight(t), weight loss target WLT(t), experience(t) is the user status US(t).

The mood(t) is the current mood at current time and/or the historic mood at times before the current time. A current change in mood or historic changes in mood may be determined from mood(t). Therefore the function F may also depend upon a current change in mood and/or historic changes in mood. A mood is one of multiple predetermined mood descriptors for the user.

The weight(t) is the current weight at current time and/or the historic weight at times before the current time. A current change in weight or historic changes in weight may be determined from weight(t). Therefore the function F may also depend upon a current change in weight and/or historic changes in weight.

The weight loss target WLT(t) is the current weight loss target at the current time and/or the historic weight loss target at times before the current time. Whether a current weight loss target has been hit or missed may be determined from WLT(t) and weight(t). Whether an historic weight loss target has been hit or missed may be determined from WLT(t) and weight(t).

Therefore the function F may also depend upon a current performance against weight loss target and/or an historic performance against weight loss target.

The experience(t) is the current experience of the user at current time. A user may, for example be a new or inexperienced user or an experienced user.

The function F may be a linear or non-linear function. It may be coded as a look-up table where a particular user status US(t) (combination of particular values of mood(t), weight(t), weight loss target WLT(t), experience(t)) defines a vector that points to a defined outcome, the defined outcome specifying at least some of the content delivered. Alternatively, the function F may be provided by a trained neural network, a hidden Markov model or similar The function F may for example be used to determine a user parameter based on actual weight, or based on an assessment of user engagement dependent upon user weight, prior user weight, experience, and mood of the user.

In some examples, an outcome $O_{M,D}$ is defined where M represents mood and D represents a descriptor parameterizing the user's current and historic activities. Each outcome $O_{M,D}$ is associated with the delivery of particular content to a user. Each outcome $O_{M,D}$ may have at least some content unique to that outcome. Some outcomes $O_{M,D}$ may have content shared with other outcomes.

The user status US(t) is used to determine the appropriate Outcome $O_{M,D\#\#}$ Content may be automatically selected for delivery to a user, independently of experience or based on experience.

Some content may be automatically selected independently of a current weight for the user, but in dependence upon a selected one of the multiple predetermined mood descriptors for the user.

Some content may be automatically selected, in dependence upon short-term weight change and a selected one of the multiple predetermined mood descriptors for the user.

Figure 18:
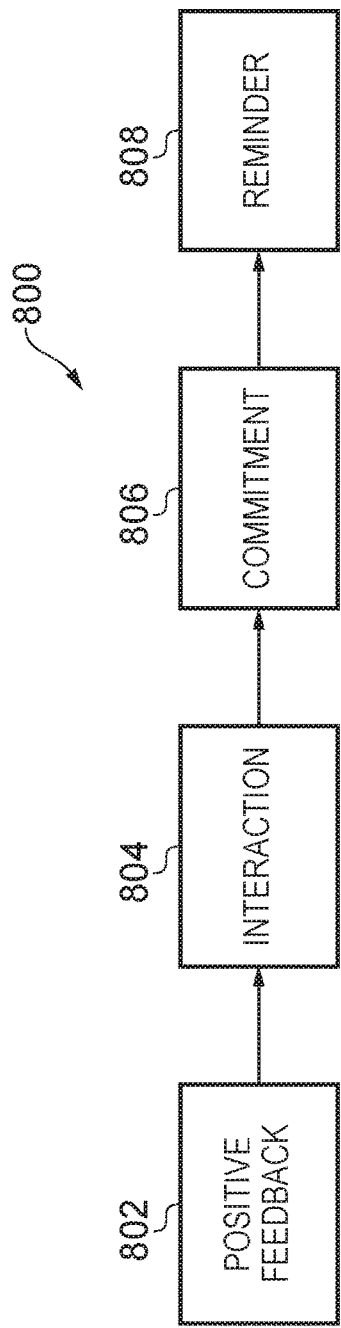
FIG. 18 illustrates an example of a system/method that describes the interaction of a weigh in module, live event module, personal support module, commitment module and prompt module.

FIG. 18 illustrates an example of a system/method 800 that describes the interaction of the weigh in module 310, the live event module 320, the commitment module 340 and the prompt module 360 from a different perspective.

A positive feedback module 802 is configured to initially and then repeatedly at different times to provide the same user-selectable option or options to users for positive feedback only and configured to output positive feedback to other users;

An interaction module 804 is configured to selectively enable a user to input user-defined information for sharing with other users and configured to output input user-defined information to other users.

A commitment module 806 is configured to prompt a user to commit to achieving a weight-loss target by a deadline and to commit to performing one or more behaviours before the deadline.

Figure 19:
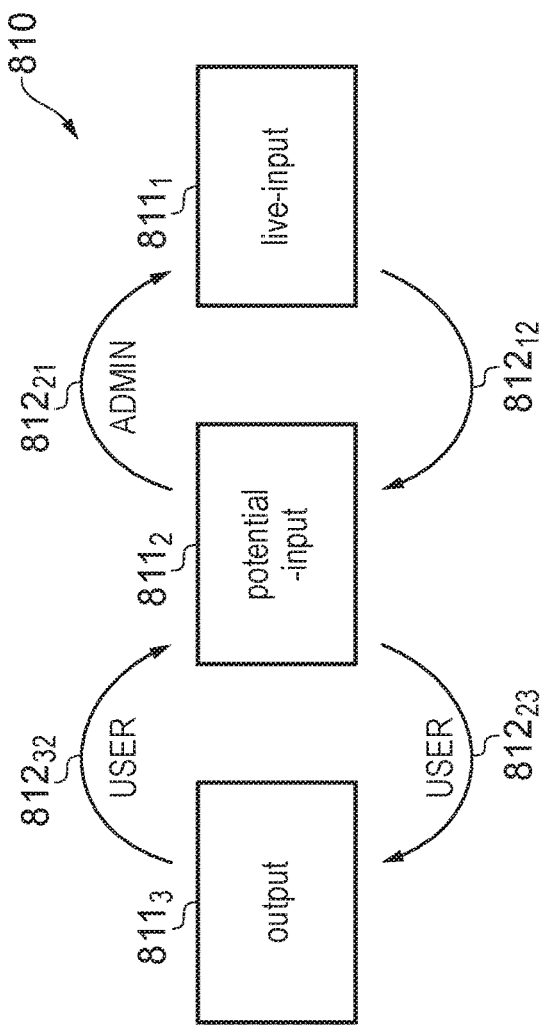
FIG. 19 illustrates a user state machine that controls the live event experienced by a user by controlling the operation of the live event module for that user.

A reminder module 808 is configured to provide a user with a prompt before the deadline FIG. 19 illustrates a user state machine 810 that controls the live event experienced by a user by controlling the operation of the live event module 320 for that user. A current state of the user state machine 810 may be referred to as a state of the user below.

The state machine 810 comprises a plurality of states 811 and transitions 812 between states 811.

A first state $811_1$ is a live-output state. While the user state machine 810 is in this state, the live event module 320 provides a first variant of the first man machine interface 214 to a user. The first variant of the man machine interface 214 is configured to enable the user, while the user has the live-input state, to:
i) input comment to be read by other users
ii) read comments input by the administrator
iii) read comments input by users, if any, simultaneously having the live-input state.

A second state $811_2$ is a potential-output state. While the user state machine 810 is in this state, the live event module 320 provides a second variant of the man machine interface 214 to the user. The second variant of the man machine interface 214 is configured to enable the user having the potential-input state to:
i) read comments input by the administrator
ii) read comments input by users having the live-input state but is not configured to enable the user, while the user has the potential-input state, to:
a) input comment to be read by other users.

A third state $811_3$ is an output state. While the user state machine 810 is in this state, the live event module 320 provides a third variant of the man machine interface 214 to a user. The third variant of the man machine interface 214 is configured to enable the user having the output state to:
i) read comments input by the administrator
ii) read comments input by users having, the live-input state but is not configured to enable the user, while the user has the potential-input state,
a) to input comment to be read by other users;

The live event module 320 provides a man machine interface 214 configured to enable a user to specify as a current state of the user state machine 810 either the output state or the potential-input state. The user cannot specify as a current state of the user state machine 810 the live-input state.

The live event module 320 provides a man machine command interface 204 to an administrator which is configured to enable the administrator to change a current state of the user state machine 810 a potential-input state to a live-input state and configured to enable the administrator to input comment. The administrator may not be able to specify as a current state of the user state machine 810 either the output state or the potential-input state.

The transition $812_{32}$ from the output state $811_3$ to the potential-input state $811_2$ is user-controlled.

The transition $812_{23}$ from the potential-input state $811_2$ to the output state $811_3$ is user-controlled.

The transition $812_{21}$ from the potential-input state $811_2$ to the live-input state $811_1$ is administrator-controlled, not user controlled.

The transition $812_{12}$ from the live-input state $811_1$ to the potential-input state $811_2$ may be automatically controlled, administrator-controlled, or user-controlled.

Figure 20C:
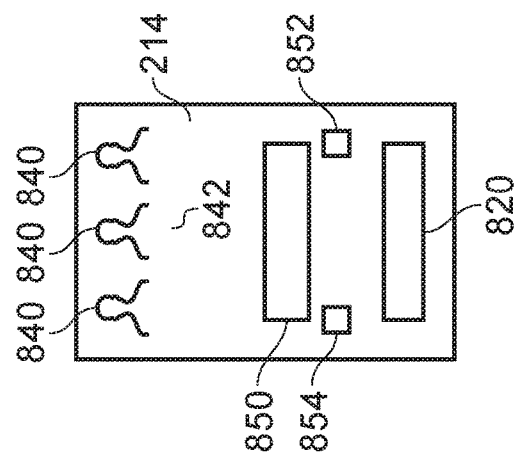
FIGS. 20A-20C illustrates examples of the man machine interface (MMI) variants associated with FIG. 19.
Figure 20B:
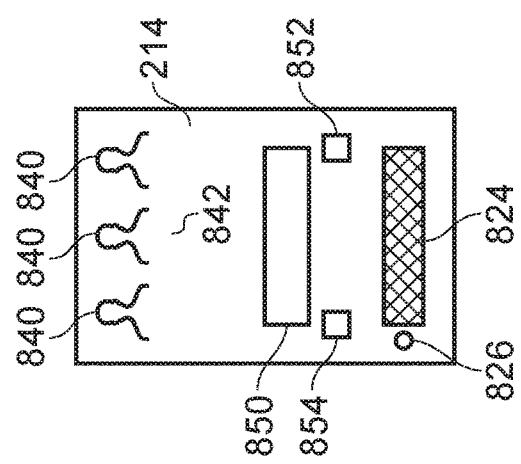
Figure 20A:
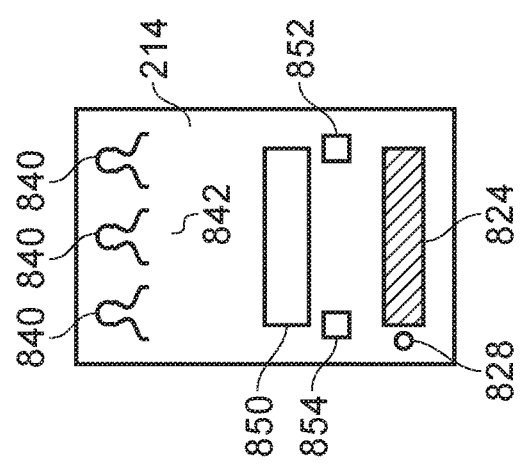

FIG. 20A illustrates an example of the man machine interface 214 (third variant). The man machine interface 214 (third variant) comprises a disabled user input field 824 which cannot be used by the user to input text. The man machine interface 214 (third variant) may also comprise a user-selected option, for example a widget 828, that can be selected to cause transition $812_{32}$ from the output state $811_3$ to the potential-input state $811_2$. The visual appearance of the disabled user input field 824 and/or widget 828 provides feedback to the user on the current state of the user state machine 810 (output state).

FIG. 20B illustrates an example of the man machine interface 214 (second variant). The man machine interface 214 (second variant) comprises a disabled user input field 824 which cannot be used by the user to input text. The man machine interface 214 (second variant) may also comprises a user-selected option, for example a widget 826, that can be selected to cause transition $812_{23}$ from the potential-input state $811_2$ to the output state $811_3$. The visual appearance of the disabled user input field 824 and/or widget 826 provides feedback to the user on the current state of the user state machine 810 (potential-input state).

FIG. 20C illustrates an example of the man machine interface 214 (first variant). The man machine interface 214 (first variant) comprises an enabled user input field 820 which can be used by the user to input text. The enabled user input field 820 has a different appearance to the disabled user input field 824 and indicates to a user that they have a live-input state.

Figure 21:
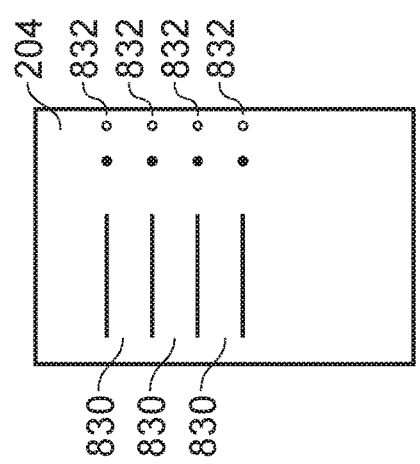
FIG. 21 illustrates an example of a man machine interface (command interface) associated with FIG. 19.

FIG. 21 illustrates an example of the man machine interface (command interface) 204. The command interface 204 presents a plurality of identifiers 830 each of which identifies a user having the potential-input state $811_2$. The command interface 204 presents an option 832 for each of the identifiers 830. When a particular option 832 associated with a particular identifier (user) is selected by the administrator the potential-input state $811_2$ for that user transitions $812_{21}$ to the live-input state $811_1$ The man machine interface 214 in each variant is configured to provide indicators 840 that indicate those users having the potential-input state and having the live-input state but not users having the output state. A different or additional indicator 842 may indicate the user or users having the live-input state.

The man machine interface 214 in each variant is configured to provide comments 850 input by the administrator and input by users.

The man machine interface 214 in each variant may be configured to provide a user selectable option, for example a widget 852 to save a selected portion of a comment 850 for future access when specifying commitments.

The man machine interface 214 in each variant may be configured to provide a user selectable option, for example a widget 854, to provide positive feedback in relation to a comment 850 made by a user. The man machine interface 214 in each variant may be configured to provide a user selectable option, for example a widget 854, to provide positive feedback in relation to each and every comment 850 made by a user.

The command interface 204 may be configured, in some examples, to enable the administrator to change a user state from a potential-input state to a live-input state for multiple users such that multiple users simultaneously have the potential-input state.

The command interface 204 may be configured, in other examples, to enable the administrator to change a user state from a potential-input state to a live-input state for one user at a time such that only a single user has the potential-input state at a time. For example, if only a fixed number of users (e.g. one user) can have the live-input state, the command interface 204 automatically changes a user state for a first user from a live-input state to a potential-input state when a user state for a first user is changed by the administrator manually from a potential-input state to a live-input state.

The live event module 320 facilitates a structured discussion, enabling an administrator to control user to user interaction during a live event.

The comments 850 that are input by a user and that are read by a user are text comments. These have a low bandwidth.

Although in some embodiments, comments 850 may be provided as audio and/or picture and/or video such comments have larger bandwidths and are less desirable from a bandwidth management perspective.

Security access protocols ensure that only users assigned to a particular group can participate in a live event for that group. The security access protocol may mandate authentication of a user before access is granted to a live event. The group is a closed group. Access by a user to a live event for a group to which they belong, may not be possible if they attempt to enter the live event after it has begun or it may be possible at any time.

Privacy access protocols ensure that a user controls what information is shared with other users in the group during the live event.

Figure 22:
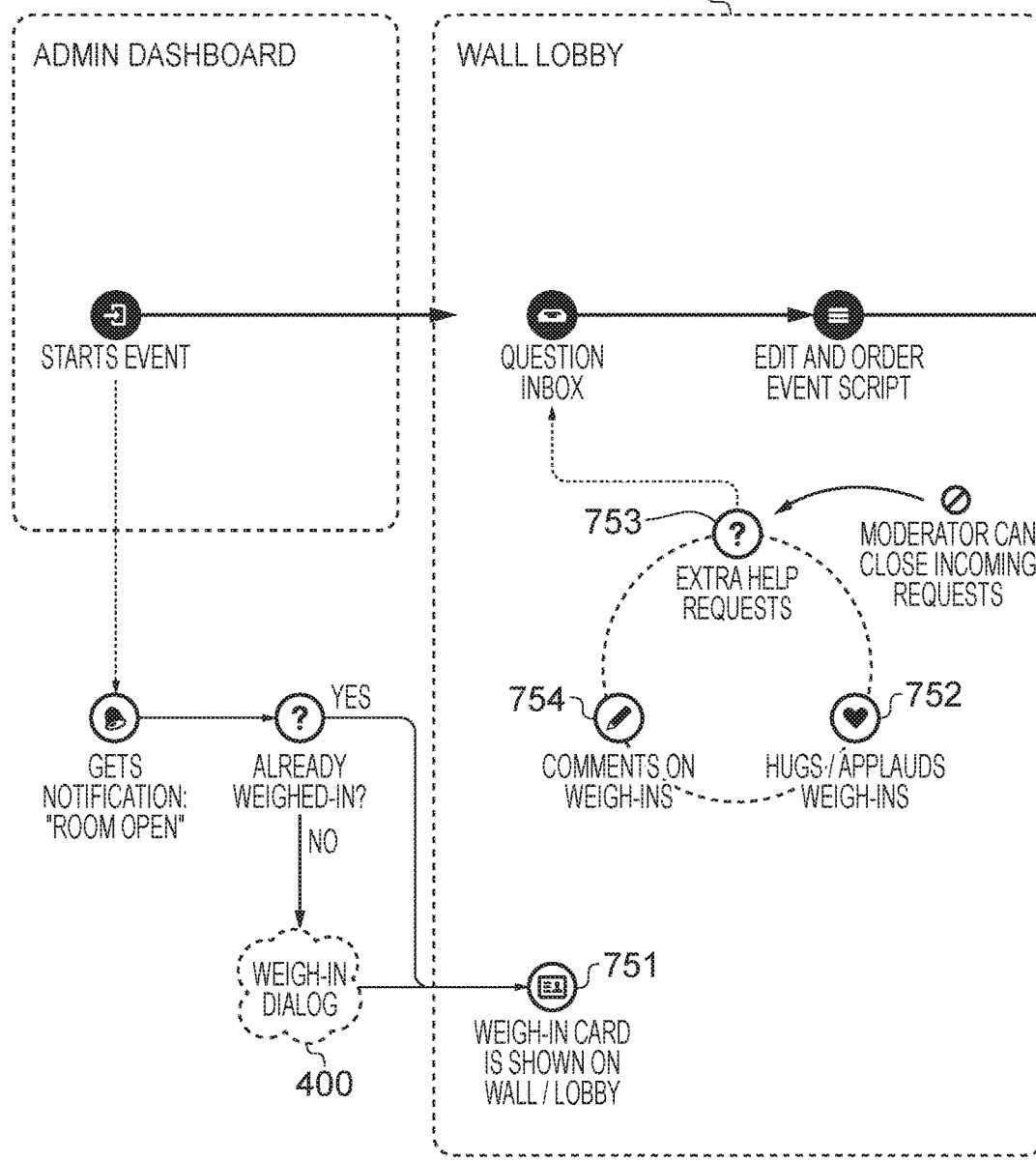
FIG. 22 illustrates an example of a process flow for a live event controlled by the live event module.
Figure 22:
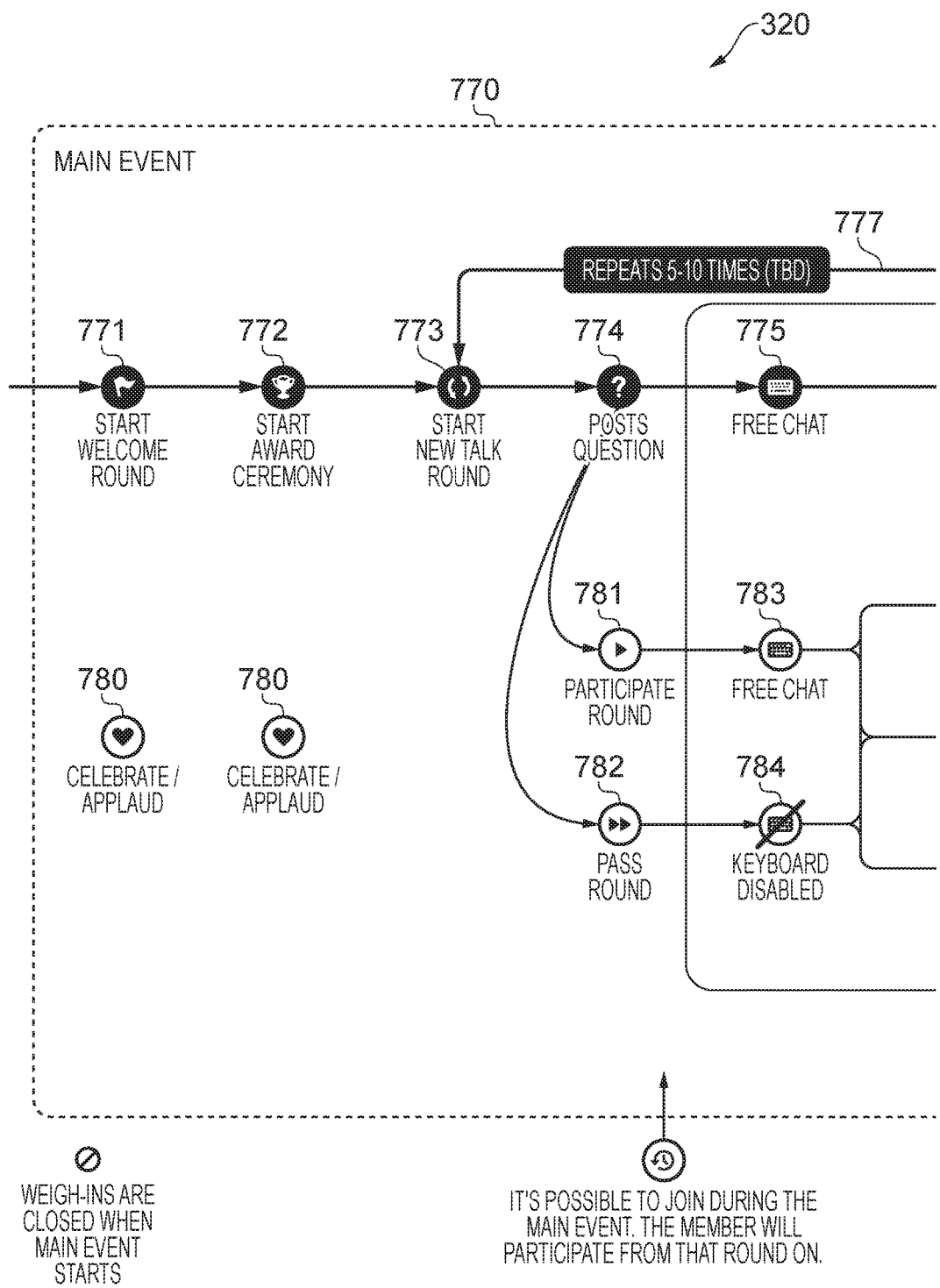
Figure 22:
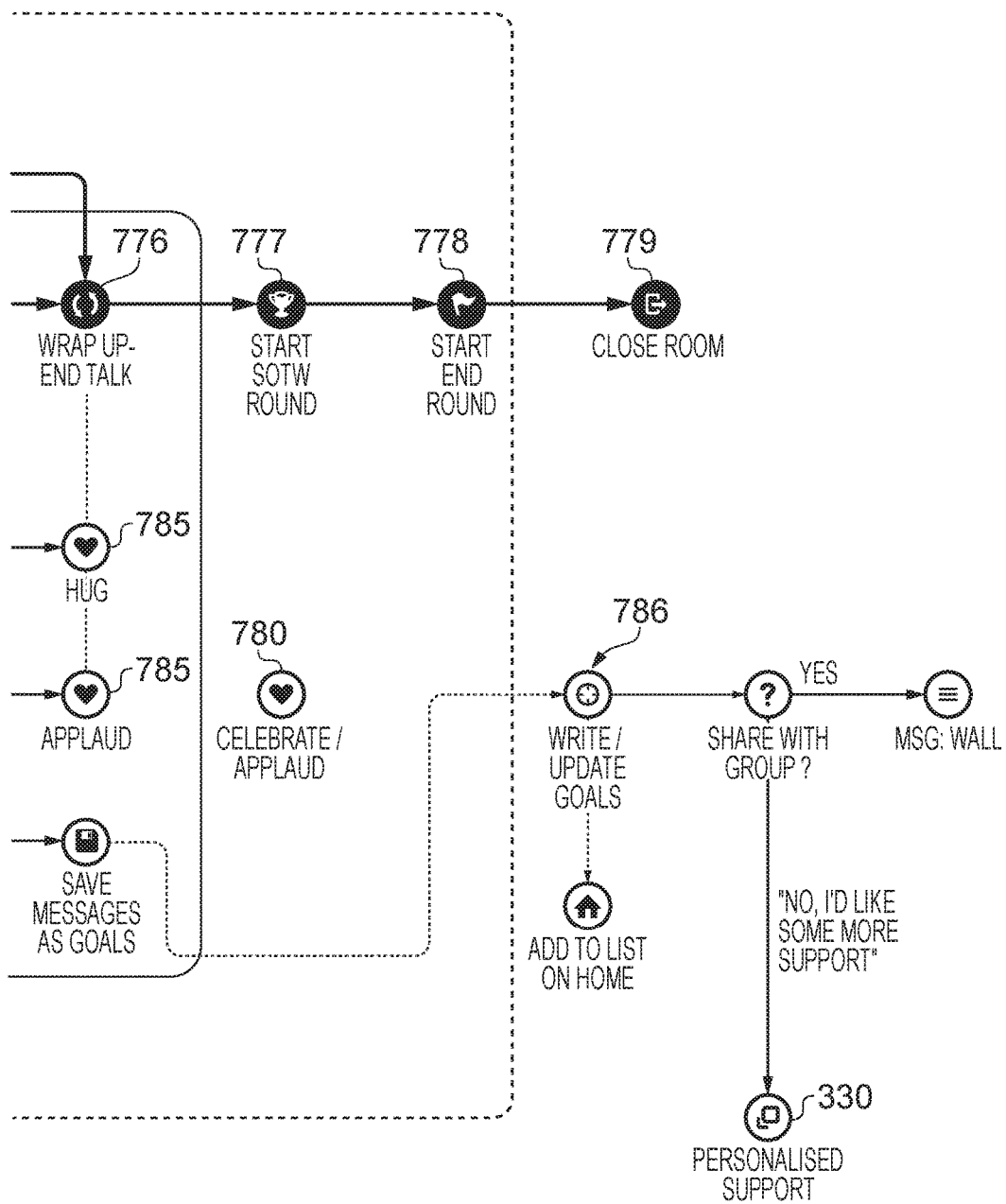

FIG. 22 illustrates an example of a process flow for a live event. The process is controlled by the live event module 320. Although a particular example is described, it will be understood that various modifications may be made.

The live event starts at Wall Lobby 750. For around 15 minutes before the Main Event starts users can 'gather' to share 751 their weight loss results for the week and have the chance to provide 752 positive feedback to other users, submit 753 a request for extra help to the administrator or comment 754 on other user's weight results.

When the administrator launches the Main Event 770 part of the Live Event, she/he first welcomes 771 new group members via the MMI 214. There is an option 780 for praise and celebration.

The administrator presents 772 weight loss and Body Magic awards via the MMI 214. There is an option 780 for praise and celebration.

The administrator starts 773 a new question/topic by posting 774 the question/topic via the MMI 214 of each user. The members of the group have a chance to say if they'd like to participate 781 in the topic or not participate 782 in the topic. If a user participates 781 in the topic, text entry via their MMI 214 may be enabled 783 so they can contribute during that topic. If a user does not participates 782 in the topic, text entry via their MMI 214 is disabled 784.

At least some of the users and the administrator contribute comments during a chat session 775.

Observers and participants can provide 785 positive feedback to comments given at any time.

The administrator may contribute by identifying a learning point, by sharing a useful article or recipe, or by giving them requested support to help achieve weight loss goals and their commitments. When the administrator judges that the topic is thoroughly covered 776, she presents 777 the next question/topic via the MMI 214.

At the end of the main event (around half an hour to 45 minutes), the Slimmer of the Week award is announced 777 via the MMI 214 and members are encouraged 778 to set a commitment for the week ahead before the live event is closed 779.

The commitment process 786 has been described in detail previously.

The live event module 320 therefore enables real-time communication between large numbers of users based on a WebSocket connection.

FIG. 23A-23D illustrates an example of a man machine interface 214 presented by the live event module 320 during a 'lobby' stage.

Figure 23B:
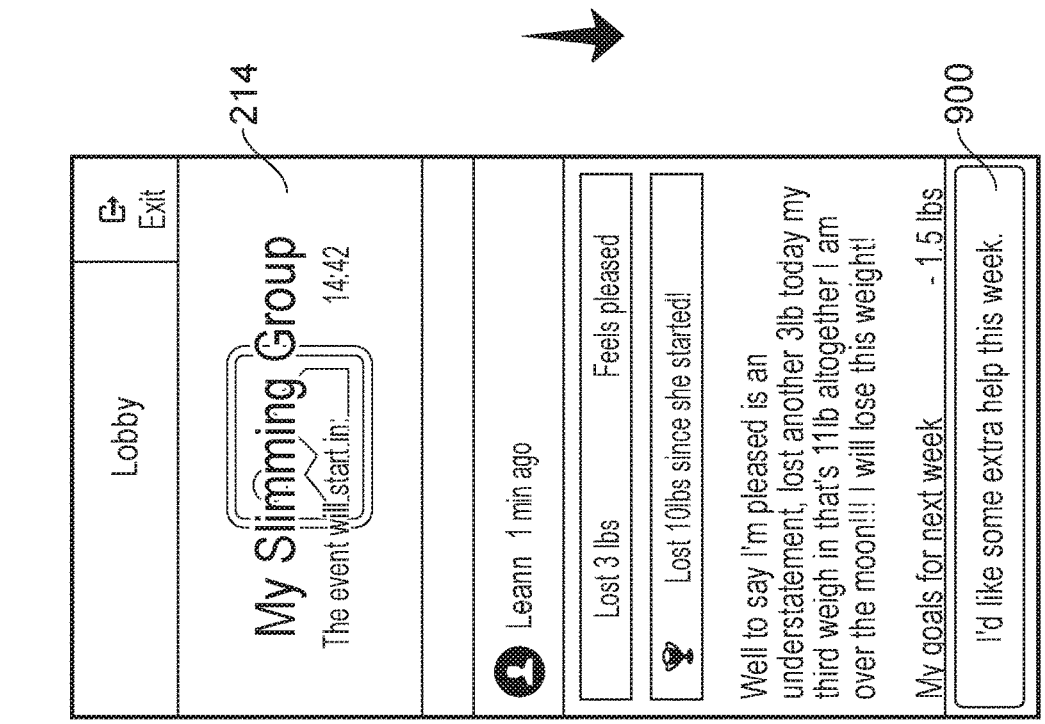
Figure 23A:
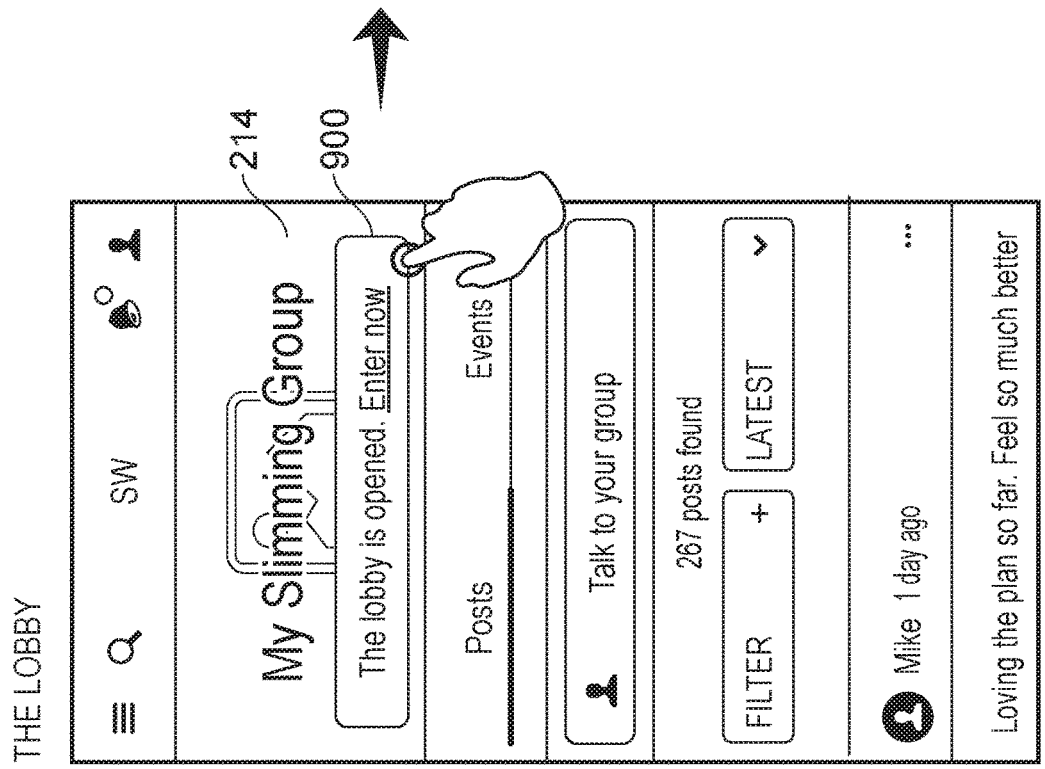

When the administrator starts the event, a widget 900 is shown (FIG. 23A). This button leads them to the lobby.

The lobby shows all the member's weigh-in cards (FIG. 23B). The latest weigh-ins will be shown on top. A widget 900 is presented that requests extra help from the administrator.

Figures 23C, 23D:
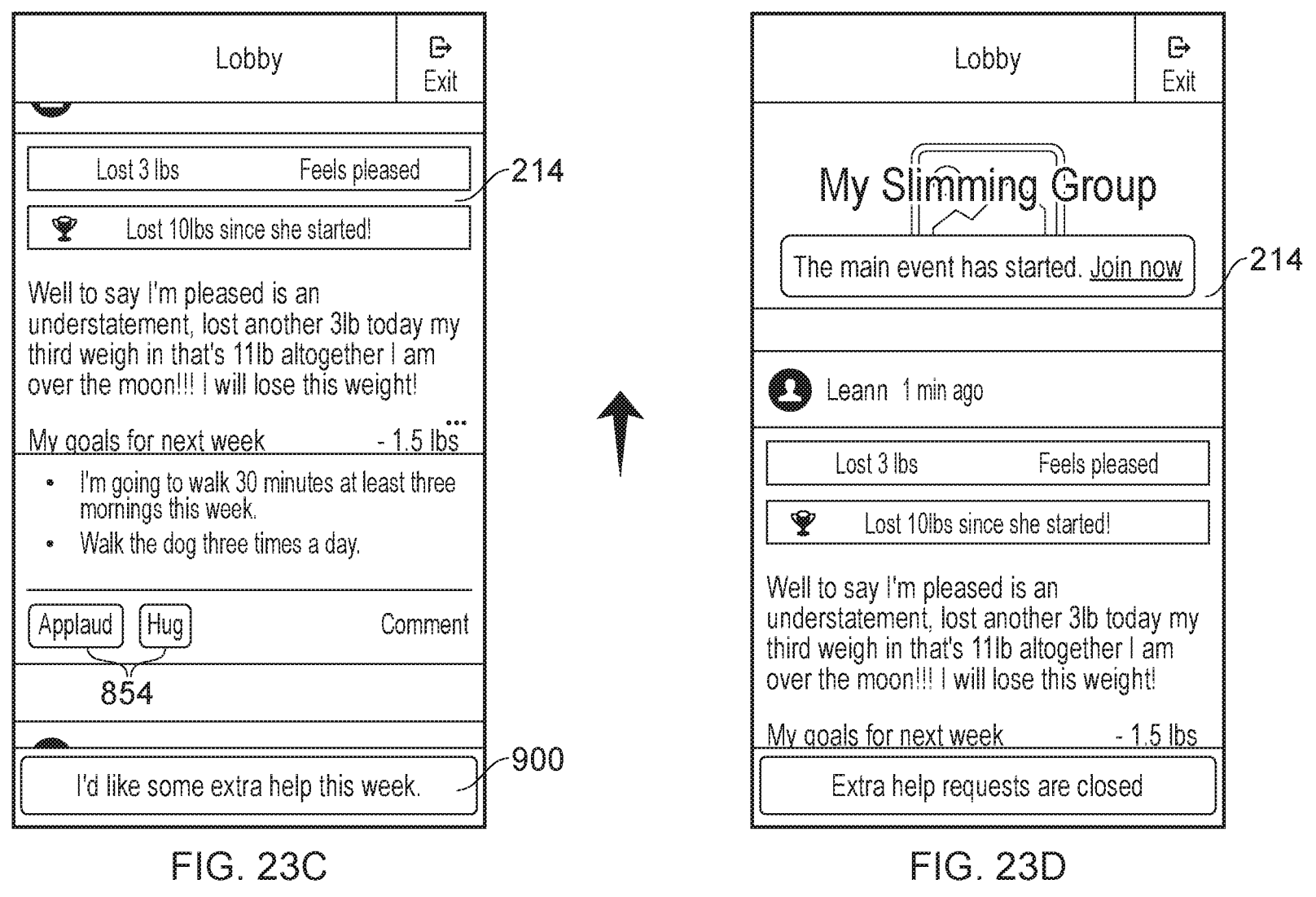

Top and bottom bars are fixed to the edges of the screen. The weigh-in cards can be scrolled (FIG. 23C). Positive feedback options 854 are presented for each weigh-in card, selecting these records positive feedback for the user associated with the weigh-in card which is communicated to the user.

When the main event starts a large widget 900 is shown which enables entry to the live event.

Figure 24D:
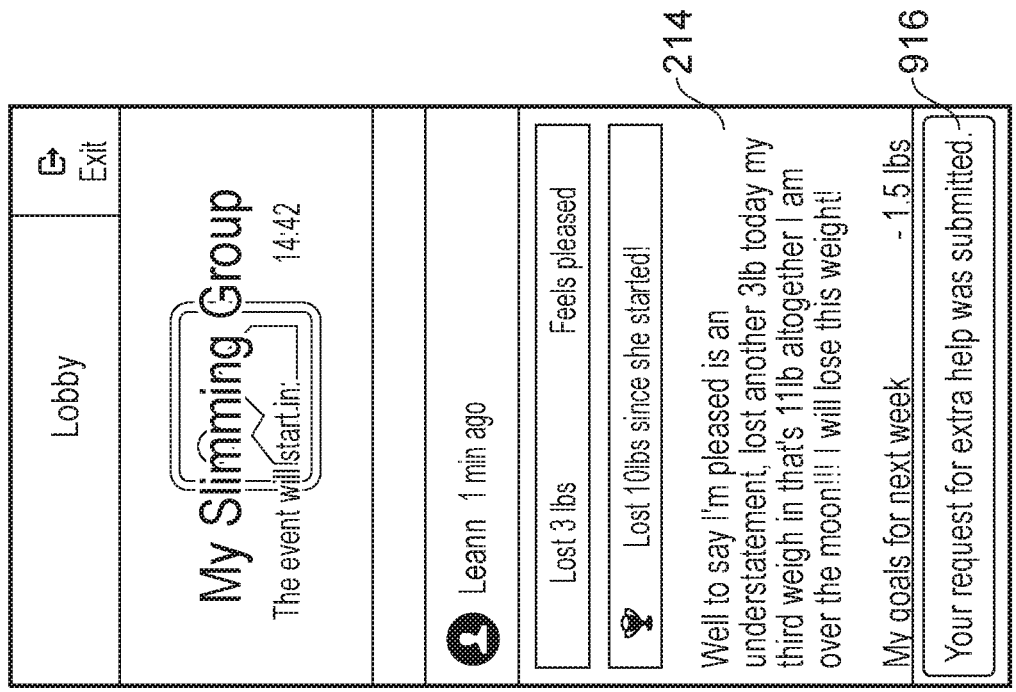

While in the lobby, the user can also create a subject/question that he would like to share with the group to discuss in the live chat by selecting a user selectable option 900 (FIGS. 23B, 23C, 24A).

FIGS. 24A-24D illustrates an example of a man machine interface 214 presented by the live event module 320 after the user selects the option to create a subject/question during the 'lobby' stage.

Figure 24C:
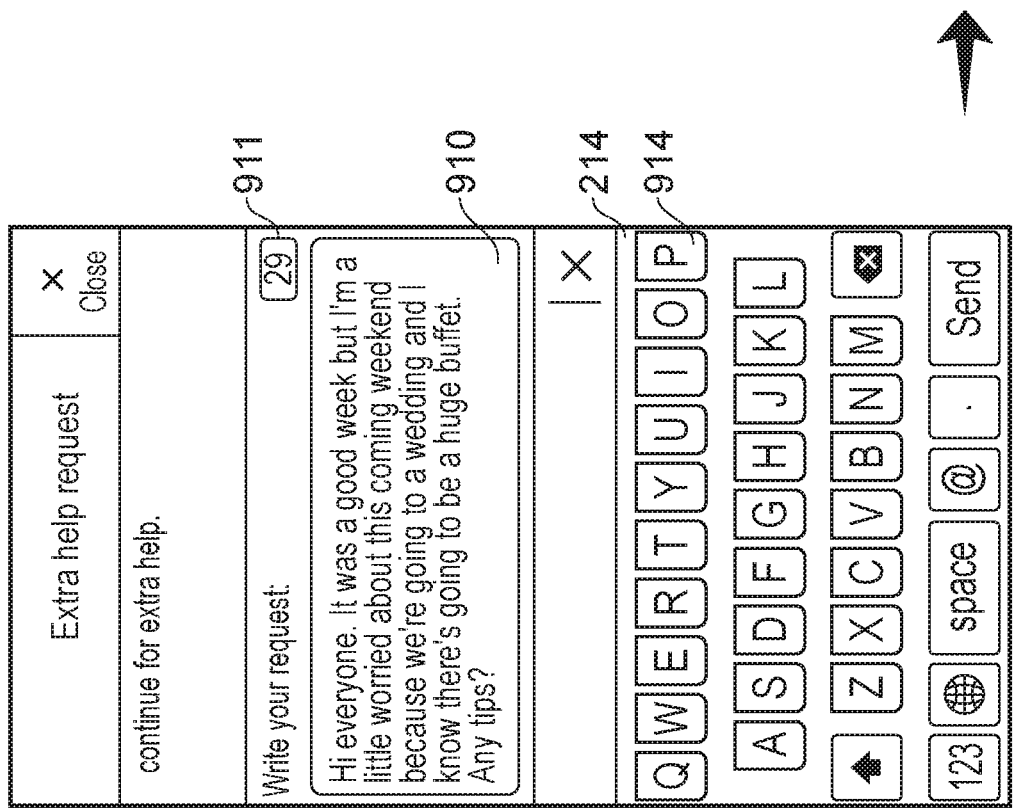

In FIG. 24B an input field 910 for inputting text asking for help or posing question is empty. If the user selects the input field 910, an alphabetic keyboard 914 is automatically provided in the MMI 214 adjacent the input field 910 (FIG. 24C). The user uses the keyboard 914 to enter text defining the user's request for help for example describing a problem or question. A request can only have 200 characters of text. Once the member starts typing a counter 911 shows the amount of characters left. If the user selects the 'send' key in the keyboard 914 the MMI 214 displays an indication 916 that the user's question has been submitted. In this example, the user is only able to make a single request for help and the user-selectable widget 900 previously presented for requesting extra help from the administrator is replaced with text 916 indicating that the user's request for extra help has been submitted.

FIGS. 25A-25D illustrates an example of a man machine interface 214 presented by the live event module 320 after the main event of the live event has started.

In each figure, the man machine interface 214 presents a user selectable option for providing positive feedback. The user-selectable option may, for example, be a user selectable widget 920.

In FIG. 25A the man machine interface 214 introduces new members during a 'welcome'. The user-selectable option may be selected by a user to provide positive feedback to the new users.

In FIG. 25B the man machine interface 214 presents awards to members during 'an award ceremony'. The user-selectable option 920 may be selected by a user to provide positive feedback to the users who have won awards. The awards may be presented for reaching significant waypoints such as loss of 10 lbs, first loss of weight, consistent loss of weight etc. The awards may be assigned to different users automatically based upon a defined algorithm and the information stored for users concerning weight and weight-loss targets.

Figure 25D:
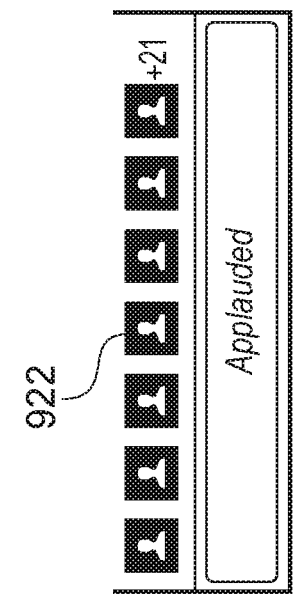
Figure 25C:
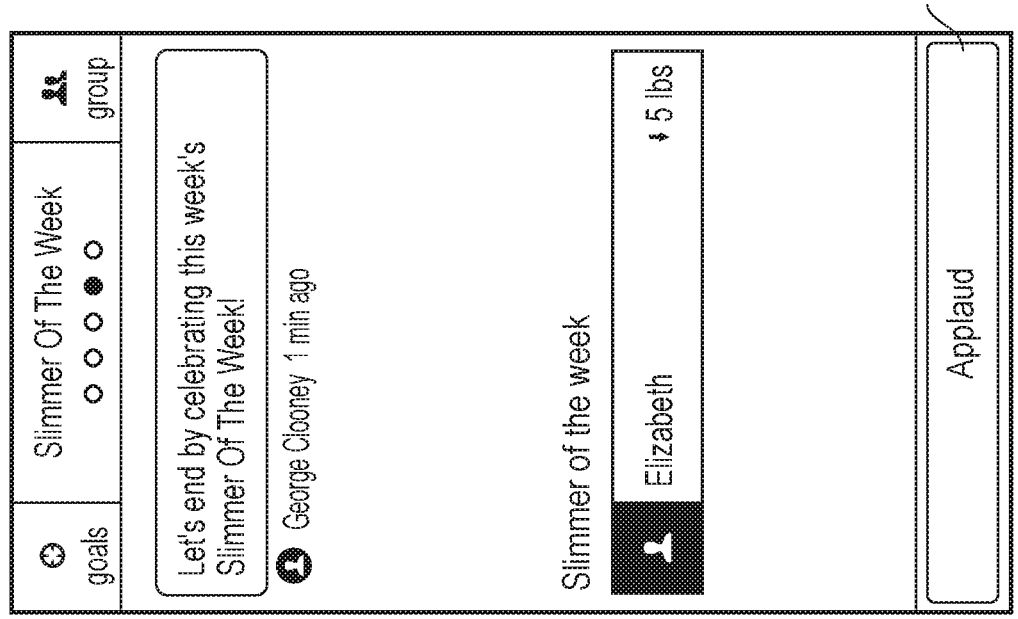

In FIG. 25C the man machine interface 214 presents a slimmer of the week award to one member during a 'slimmer of the week' ceremony. The user-selectable option 920 may be selected by a user to provide positive feedback to the user who has won the award. The award may be presented for the largest weight loss of all users in the group that week The award may be assigned to a user automatically based upon a defined algorithm and the information stored for users concerning weight.

In FIG. 25D the man machine interface 214 presents feedback 922 to all users on which users provided positive feedback during the welcome (FIG. 25A), the award ceremony (FIG. 25B) and the slimmer of the week ceremony (FIG. 25C).

FIGS. 26A-26E illustrate an example of a man machine interface 214 presented by the live event module 320 during a chat round to every user. There may be multiple successive chat rounds in a live event.

Figures 26A, 26B:
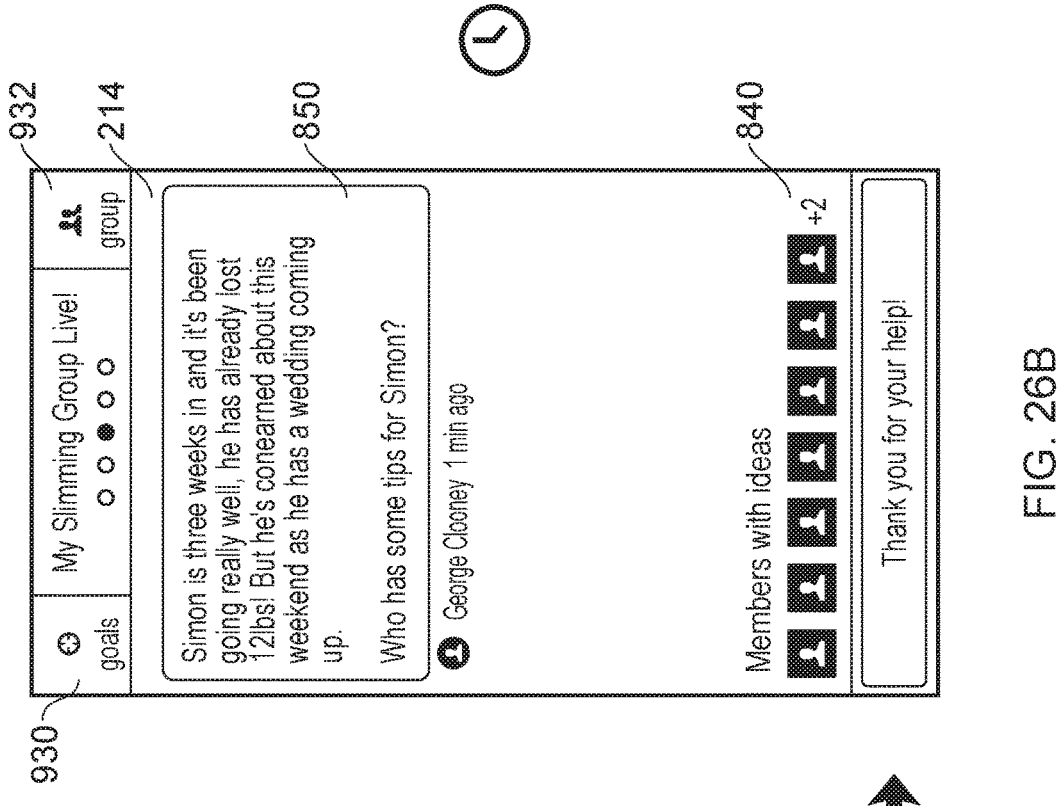

In FIG. 26A the man machine interface 214 presents content 850' posted by the administrator. The content 850' is a story with a question. The man machine interface 214 simultaneously presents a user-selectable option, for example widget 828, to change the user's state from the output state to the potential-input state.

Selecting the option 828 indicates that the user has an answer/contribution to make to the group in response to the story and question posed.

When the option 828 is selected it is no longer a user-selectable option but provides visual feedback that the user-selectable option 828 has been selected.

In FIG. 26B, the man machine interface 214 is configured to provide indicators 840 that indicate those users having the potential-input state and having the live-input state but not users having the output state.

FIG. 26C illustrates an example of the man machine interface 214 comprising an enabled user input field 820 which can be used by the user to input text. The enabled user input field 820 has a different appearance to a disabled user input field 824 and indicates to a user that they have a live-input state.

FIG. 26D illustrates an example of the man machine interface 214 comprising a disabled user input field 824 which cannot be used by the user to input text. The visual appearance of the disabled user input field 824 provides feedback to the user on the current state of the user state machine 810 (potential-input state).

Figure 26E:
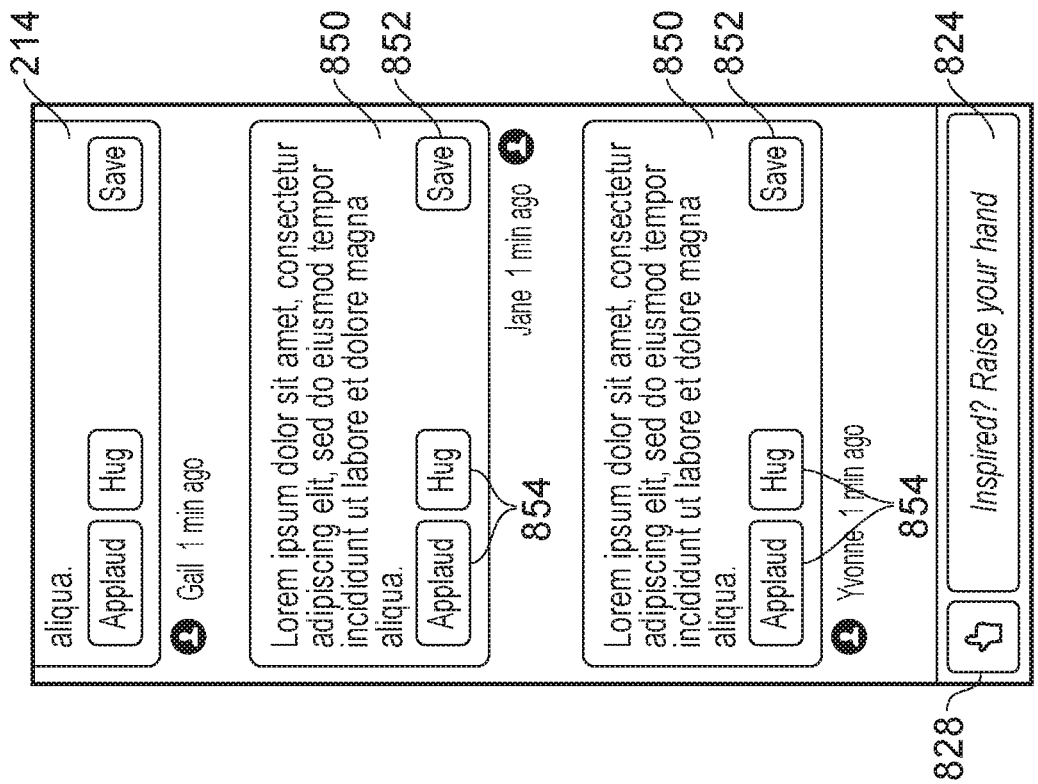

FIG. 26E illustrates an example of the man machine interface 214 comprising a disabled user input field 824 which cannot be used by the user to input text. The man machine interface 214 (third variant) may also comprises a user-selectable option, for example a widget 828, that can be selected to cause transition $812_{32}$ from the output state $811_3$ to the potential-input state $811_2$. The visual appearance of the disabled user input field 824 and/or widget 828 provides feedback to the user on the current state of the user state machine 810 (output state).

The man machine interface 214 in each of FIGS. 26C, 26D, 26E is configured to provide comments 850' input by the administrator and comments 850 input by users.

The man machine interface 214 in each of FIGS. 26C, 26D, 26E may be configured to provide a user selectable option, for example a widget 852 to save a selected portion of a user comment 850 or administrator comment 850' for future access when specifying commitments. The comment may be edited before it is saved.

The man machine interface 214 in each of FIGS. 26C, 26D, 26E may be configured to provide a user selectable option, for example a widget 854, to provide positive feedback in relation to every comment 850 made by a user.

The man machine interface 214 in each of FIGS. 26A, 26B may be configured to provide a user selectable option, for example a widget 930, for accessing the user's goals (commitments) for read and write access.

The man machine interface 214 in each of FIGS. 26A, 26B may be configured to provide a user selectable option, for example a widget 932, for accessing the user's group. This provides an overview of the members of the group, for example, indicating which members of the group are present as users and the current state of each user. This may also provide an exit route from the live event.

Privacy setting are designed to encourage sharing of user information with the administrator Privacy settings may for example comprise:
no sharing
use for personalised service such as personalised support
share with administrator
share other users They may be generic applying to all information or they may be set in relation to different types of information such as:
Current weight
Current weight change
Current target weight
Current mood
Planned activities
Recent user statistics
Recent user awards Historic weight
Historic weight change
Historic target weight
Historic mood
Historic activities
Historic user statistics
Historic user awards Inter alia the following technical problems and solutions are evident from the preceding description:

Attendance is a commitment-prompt, scheduled, lock-out
Use man machine interface to prompting for positive feedback from multiple user simultaneously without impacting dynamic
Providing warmth and support-publicity of who feedback, Togetherness-attendees identified
Live event, real-time-Low bandwidth-text
Remote users-computer network such as internet Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

According to various, but not necessarily all, examples there is provided a method comprising:
causing a man machine interface to be provided to each one of a plurality of remote users,
wherein the man machine interface is configured to enable a remote user to input a current weight and to select one of a multiple predetermined mood descriptors;
causing a man machine interface to be provided to each one of a plurality of remote users,
wherein the man machine interface is configured to provide at least a first user-selectable option and a second user-selectable option;
wherein the first user-selectable option when selected causes a man machine interface to be provided that enables recording of a user commitment to a weight loss target and at least one behaviour, and
wherein a second option when selected causes a man machine interface to be provided that enables personalized content delivery based upon at least the user input weight and selected one of the multiple predetermined mood descriptors, before subsequently enabling recording of a user commitment to a weight loss and at least one behaviour.

This method, wherein the man machine interface is configured to provide not only the first user-selectable option and the second user-selectable option, but also a third user-selectable option,
wherein the third user-selectable option when selected causes a man machine interface to be provided that enables a real-time communication event, before subsequently enabling recording of a user commitment to a weight loss and at least one user behaviour.

According to various, but not necessarily all, examples there is provided a system comprising: a commitment module configured to enable recording of a user commitment to a weight loss target and at least one user behaviour;
a personal support module configured to enable personalized content delivery based upon at least a user input weight and a selected one of multiple predetermined mood descriptors;
a weigh-in module configured to:
provide a man machine interface configured to enable a user to input the current weight and to select one of the multiple predetermined mood descriptors; and
provide a man machine interface configured to provide at least a first user-selectable option and a second user-selectable option;
wherein the first user-selectable option when selected causes a man machine interface to be provided by the commitment module that enables recording of a user commitment to a weight loss target and at least one behaviour, and
wherein a second option when selected causes a man machine interface to be provided by the personal support module that enables personalized content delivery based upon at least the user input weight and selected one of the multiple predetermined mood descriptors, before subsequently enabling via the commitment module recording of a user commitment to a weight loss and at least one user behaviour.

According to various, but not necessarily all, examples there is provided a method comprising:
providing a man machine interface to each one of a plurality of users, wherein the man machine interface is configured to enable a user to input a current weight and to select one of a multiple predetermined mood descriptors;
providing a man machine interface that enables automatic personalized content delivery based upon at least the user input weight and selected one of the multiple predetermined mood descriptors.

This method further comprising: subsequently enabling recording of a user commitment to a weight loss target and at least one behaviour.

This method further comprising: automatically selecting content for delivery to a user as personalized content based upon one or more of:
weight change for that user;
selected one of the multiple predetermined mood descriptors for the user experience of the user.

This method further comprising: automatically selecting content for delivery to a user as personalized content based upon analysis of historic weights.

This method further comprising: automatically selecting content for delivery to a user as personalized content based upon analysis of performance against current user commitments to a weight loss target.

This method further comprising: automatically selecting content for delivery to a user as personalized content based upon analysis of historic performance against recorded user commitments to weight loss targets.

This method further comprising: an algorithmic assessment of user engagement based on user weight, prior user weight, experience, and selected one of the multiple predetermined mood descriptors for the user.

This method further comprising: automatically selecting content for delivery to a user as personalized content, independently of experience, when a current weight for the user is indicative of a reversal from weight gain to weight loss, is indicative of achieving a weight loss target, is indicative of missing a weight loss target, is indicative of a chronic failure to lose weight, is indicative of repeatedly achieving weight loss targets, is indicative of repeatedly missing weight loss targets.

This method further comprising: automatically selecting content for delivery to a user as personalized content, when the user is inexperienced, independently of a current weight for the user, but in dependence upon selected one of the multiple predetermined mood descriptors for the user.

This method further comprising: automatically selecting content for delivery to a user as personalized content, when the user is inexperienced, in dependence upon positive current mood for any weight and for long term weight loss in dependence upon mood.

This method further comprising: automatically selecting content for delivery to a user as personalized content, when the user is experienced, in dependence upon short-term weight change and selected one of the multiple predetermined mood descriptors for the user.

According to various, but not necessarily all, examples there is provided a system comprising:
a weigh-in module configured to provide a man machine interface configured to enable a user to input a current weight and to select one of a multiple predetermined mood descriptors; and
a personal support module configured to provide a man machine interface that enables automatic personalized content delivery based upon at least the user-input weight and selected one of the multiple predetermined mood descriptors.

According to various, but not necessarily all, examples there is provided a system comprising:
a positive feedback module configured to initially and then repeatedly at different times provide the same user-selectable option or options to users for positive feedback only and configured to output positive feedback to other users;
an interaction module configures to selectively enable a user to input user-defined information for sharing with other users and configured to output input user-defined information to other users;
a commitment module configured to prompt a user to commit to achieving a weight-loss target by a deadline and to commit to performing one or more behaviours before the deadline; and a reminder module configured to provide a user with a t prompt before the deadline According to various, but not necessarily all, examples there is provided a method comprising:
repeatedly at different times providing the same user-selectable option or options to users for positive feedback only;
outputting positive feedback to other users;
selectively enabling a user to input user-defined information for sharing with other users outputting the input user-defined information to other users
prompting a user to commit to achieving a weight-loss target by a deadline and to commit to performing one or more behaviours before the deadline
providing a user with a prompt before the deadline According to various, but not necessarily all, examples there is provided an apparatus comprising:
means for providing a man machine interface to a user of the apparatus, wherein the man machine interface is configured to enable the user to specify a state selected from a group comprising an output state and a potential-input state but not comprising a live-input state, and wherein a remote administrator can change a specified state from a potential-input state to a live-input state;
means for providing a first variant of the first man machine interface to the user while the specified state is the live-input state, wherein the first variant of the man machine interface is configured to enable the user, while the specified state is a live-input state, to input comment to be read by remote users and to read comments input by the remote administrator and to read comments input by remote users, if any, simultaneously using the first variant of the first man machine interface;
means for providing a second variant of the man machine interface to the user while the specified state is the potential-input state, wherein the second variant of the man machine interface is configured to enable the user, while the specified state is the potential-input state, to read comments input by the remote administrator and to read comments input by remote users using the first variant of the first man machine interface but is not configured to enable the user, while the specified state is the potential-input state, to input comment to be read by other remote users;
means for providing a third variant of the man machine interface to the user while the specified state is the output state, wherein the third variant of the man machine interface is configured to enable the user, while the specified state is the output state, to read comments input by the remote administrator and to read comments input by other remote users using the first variant of the first man machine interface but is not configured to enable the user, while the specified state is the potential-input state, to input comment to be read by other remote users.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising, at a computer:

causing a man machine interface to be provided to each one of a plurality of remote users, wherein the man machine interface is configured to enable a remote user to be specified to have a particular user state selected from a group comprising an output state and a potential-input state but not comprising a live-input state;

causing a command interface to be provided to a remote administrator, wherein the command interface is configured to enable the remote administrator to change a user state from a potential-input state to a live-input state and configured to enable the remote administrator to input comment;

causing a first variant of the first man machine interface to be provided to a remote user while the remote user has a live-input state, wherein the first variant of the man machine interface is configured to enable the remote user, while the remote user has the live-input state, to input comment to be read by other remote users and to read comments input by the remote administrator and read comments input by remote users, if any, simultaneously having the live-input state;

causing a second variant of the man machine interface to be provided to a remote user while the remote user has a potential-input state, wherein the second variant of the man machine interface is configured to enable the remote user having the potential-input state to read comments input by the remote administrator and read comments input by remote users having the live-input state but is not configured to enable the remote user, while the remote user has the potential-input state, to input comment to be read by other remote users; and causing a third variant of the man machine interface to be provided to a remote user while the remote user has an output state, wherein the third variant of the man machine interface is configured to enable the remote user having the output state to read comments input by the remote administrator and read comments input by other remote users having, the live-input state but is not configured to enable the remote user, while the remote user has the potential-input state, to input comment to be read by other remote users;

the method further comprising:

causing a second man machine interface to be provided to each one of the plurality of remote users, wherein the second man machine interface is configured to enable a remote user to input a current weight and to select one of multiple predetermined mood descriptors;

causing the second man machine interface to be provided to each one of a plurality of remote users, wherein the second man machine interface is configured to at least provide a first user-selectable option and a second user-selectable option;

wherein the first user-selectable option when selected causes a commitment man machine interface to be provided that enables recording of a user commitment to a weight loss target and at least one behavior, and wherein the second option when selected causes a content-delivery man machine interface to be provided that enables automatic personalized content delivery based upon at least one of the user input weight and selected one of the multiple predetermined mood descriptors, before subsequently enabling recording of a user commitment to a weight loss and at least one behavior, the method, further comprising:

(i) automatically selecting content for delivery to a remote user as personalized content, independently of experience, when a current weight for the remote user is indicative of a reversal from weight gain to weight loss, is indicative of achieving a weight loss target, is indicative of missing a weight loss target, is indicative of a chronic failure to lose weight, is indicative of repeatedly achieving weight loss targets, or is indicative of repeatedly missing weight loss targets; and/or (ii) automatically selecting content for delivery to a remote user as personalized content, when the remote user is inexperienced, independently of a current weight for the remote user, but in dependence upon selected one of the multiple predetermined mood descriptors for the remote user; and/or (iii) automatically selecting content for delivery to a remote user as personalized content, when the remote user is inexperienced, in dependence upon positive current mood for any weight and for long term weight loss in dependence upon mood; and/or (iv) automatically selecting content for delivery to a remote user as personalized content, when the remote user is experienced, in dependence upon short-term weight change and selected one of the multiple predetermined mood descriptors for the remote user.

2. The method as claimed in claim 1, wherein the man machine interface in the first, second and third variant is configured to indicate remote users that have the potential-input state but not remote users that have the output state.

3. The method as claimed in claim 1, comprising causing a command interface to be provided for the remote administrator, configured to enable the remote administrator to change a user state from a potential-input state to a live-input state for multiple remote users such that multiple remote users simultaneously have the potential-input state.

4. The method as claimed in claim 1, comprising causing a command interface to be provided for the remote administrator, configured to enable the administrator to change a user state from a potential-input state to a live-input state for one remote user at a time such that only a single remote user has the potential-input state at a time.

5. The method as claimed in claim 1, wherein the first variant of the man machine interface comprises an enabled text input field configured to indicate to the remote user that they have a live-input state, the second variant of the man machine interface comprises a disabled text input field configured to indicate to a remote user that they have a potential-input state and the third variant of the man machine interface comprises a disabled text input field configured to indicate to a remote user that they have an output state.

6. The method as claimed in claim 1, wherein the third variant of man machine interface comprises a user selectable option to change a user state from the output state to the potential-input state.

7. The method as claimed in claim 1, wherein each of the first, second and third variants of the man machine interface comprise a user selectable option to save a selected portion of a comment for future access when specifying commitments.

8. The method as claimed in claim 1, wherein each of the first, second and third variants of the man machine interface comprises a user selectable option to provide positive feedback in relation to comments made by a remote user.

9. The method as claimed in claim 1, wherein each of the first, second and third variants of the man machine interface comprises a same user selectable option to provide positive feedback in relation to each and every comment made by a remote user.

10. The method as claimed in claim 1, wherein the second man machine interface is configured to provide not only the first user-selectable option and the second user-selectable option, but also a third user-selectable option,
  wherein the third user-selectable option when selected causes a communication man machine interface to be provided that enables a real-time communication event, before subsequently enabling recording of a user commitment to a weight loss and at least one user behavior.

11. The method as claimed in claim 1, further comprising: subsequently enabling recording of a user commitment to a weight loss target and at least one behavior.

12. The method as claimed in claim 1, further comprising: automatically selecting content for delivery to a remote user as personalized content based upon one or more of:
weight change for that remote user;
selected one of the multiple predetermined mood descriptors for the remote user experience of the remote user.

13. The method as claimed in claim 1, further comprising: automatically selecting content for delivery to a remote user as personalized content based upon one or more of: analysis of historic weights of the remote user,
analysis of performance against current user commitments to a weight loss target,
analysis of historic performance against recorded user commitments to weight loss targets.

14. The method as claimed claim 1, further comprising: an algorithmic assessment of user engagement based on user weight, prior user weight, user experience, and a user-selected one of the multiple predetermined mood descriptors for the remote user.

15. The method as claimed in claim 1, comprising:
repeatedly at different times causing, in man machine interfaces, to be provided the same user-selectable option or options to remote users for providing positive feedback only; and
causing outputting of positive feedback provided by each remote user to other remote users.

16. The method as claimed in claim 1, comprising:
prompting a remote user to commit to achieving a weight-loss target by a deadline and to commit to performing one or more behaviors before the deadline; and
providing a remote user with a prompt before the deadline.

17. A computer-implemented method comprising, at a computer:
  causing a man machine interface to be provided to a user of the computer, wherein the man machine interface is configured to enable the user to specify a state selected from a group comprising an output state and a potential-input state but not comprising a live-input state, and wherein a remote administrator can change a specified state from a potential-input state to a live-input state;
  causing a first variant of the first man machine interface to be provided to the user while the specified state is the live-input state, wherein the first variant of the man machine interface is configured to enable the user, while the specified state is a live-input state, to input comment to be read by remote users and to read comments input by the remote administrator and to read comments input by remote users, if any, simultaneously using the first variant of the first man machine interface;
  causing a second variant of the man machine interface to be provided to the user while the specified state is the potential-input state, wherein the second variant of the man machine interface is configured to enable the user, while the specified state is the potential-input state, to read comments input by the remote administrator and to read comments input by remote users using the first variant of the first man machine interface but is not configured to enable the user, while the specified state is the potential-input state, to input comment to be read by other remote users;
  causing a third variant of the man machine interface to be provided to the user while the specified state is the output state, wherein the third variant of the man machine interface is configured to enable the user, while the specified state is the output state, to read comments input by the remote administrator and to read comments input by other remote users using the first variant of the first man machine interface but is not configured to enable the user, while the specified state is the potential-input state, to input comment to be read by other remote users;
  the computer-implemented method further comprising:
  causing a second man machine interface to be provided to each one of the plurality of remote users, wherein the second man machine interface is configured to enable a remote user to input a current weight and to select one of multiple predetermined mood descriptors;
  causing the second man machine interface to be provided to each one of a plurality of remote users, wherein the second man machine interface is configured to at least provide a first user-selectable option and a second user-selectable option;
    wherein the first user-selectable option when selected causes a commitment man machine interface to be provided that enables recording of a user commitment to a weight loss target and at least one behavior, and
    wherein the second option when selected causes a content-delivery man machine interface to be provided that enables automatic personalized content delivery based upon at least one of the user input weight and selected one of the multiple predetermined mood descriptors, before subsequently enabling recording of a user commitment to a weight loss and at least one behavior,
  the computer-implemented method, further comprising:
  (i) automatically selecting content for delivery to a remote user as personalized content, independently of experience, when a current weight for the remote user is indicative of a reversal from weight gain to weight loss, is indicative of achieving a weight loss target, is indicative of missing a weight loss target, is indicative of a chronic failure to lose weight, is indicative of repeatedly achieving weight loss targets, or is indicative of repeatedly missing weight loss targets; and/or
  (ii) automatically selecting content for delivery to a remote user as personalized content, when the remote user is inexperienced, independently of a current weight for the remote user, but in dependence upon selected one of the multiple predetermined mood descriptors for the remote user; and/or
  (iii) automatically selecting content for delivery to a remote user as personalized content, when the remote user is inexperienced, in dependence upon positive current mood for any weight and for long term weight loss in dependence upon mood; and/or
  (iv) automatically selecting content for delivery to a remote user as personalized content, when the remote user is experienced, in dependence upon short-term weight change and selected one of the multiple predetermined mood descriptors for the remote user.

18. An apparatus comprising:
 at least one processor; and
 at least one memory including computer program code
 the at least one memory and the computer program code configured to, with the at least one processor, cause the apparatus at least to perform:
 causing a man machine interface to be provided to a user of the computer, wherein the man machine interface is configured to enable the user to specify a state selected from a group comprising an output state and a potential-input state but not comprising a live-input state, and wherein a remote administrator can change a specified state from a potential-input state to a live-input state;
 causing a first variant of the first man machine interface to be provided to the user while the specified state is the live-input state, wherein the first variant of the man machine interface is configured to enable the user, while the specified state is a live-input state, to input comment to be read by remote users and to read comments input by the remote administrator and to read comments input by remote users, if any, simultaneously using the first variant of the first man machine interface;
 causing a second variant of the man machine interface to be provided to the user while the specified state is the potential-input state, wherein the second variant of the man machine interface is configured to enable the user, while the specified state is the potential-input state, to read comments input by the remote administrator and to read comments input by remote users using the first variant of the first man machine interface but is not configured to enable the user, while the specified state is the potential-input state, to input comment to be read by other remote users;
 causing a third variant of the man machine interface to be provided to the user while the specified state is the output state, wherein the third variant of the man machine interface is configured to enable the user, while the specified state is the output state, to read comments input by the remote administrator and to read comments input by other remote users using the first variant of the first man machine interface but is not configured to enable the user, while the specified state is the potential-input state, to input comment to be read by other remote users;
 causing a second man machine interface to be provided to each one of the plurality of remote users, wherein the second man machine interface is configured to enable a remote user to input a current weight and to select one of multiple predetermined mood descriptors;
 causing the second man machine interface to be provided to each one of a plurality of remote users, wherein the second man machine interface is configured to at least provide a first user-selectable option and a second user-selectable option;
  wherein the first user-selectable option when selected causes a commitment man machine interface to be provided that enables recording of a user commitment to a weight loss target and at least one behavior, and
  wherein the second option when selected causes a content-delivery man machine interface to be provided that enables automatic personalized content delivery based upon at least one of the user input weight and selected one of the multiple predetermined mood descriptors, before subsequently enabling recording of a user commitment to a weight loss and at least one behavior, wherein the enabling of automatic personalized content delivery comprises:
  (i) automatically selecting content for delivery to a remote user as personalized content, independently of experience, when a current weight for the remote user is indicative of a reversal from weight gain to weight loss, is indicative of achieving a weight loss target, is indicative of missing a weight loss target, is indicative of a chronic failure to lose weight, is indicative of repeatedly achieving weight loss targets, or is indicative of repeatedly missing weight loss targets; and/or
  (ii) automatically selecting content for delivery to a remote user as personalized content, when the remote user is inexperienced, independently of a current weight for the remote user, but in dependence upon selected one of the multiple predetermined mood descriptors for the remote user; and/or
  (iii) automatically selecting content for delivery to a remote user as personalized content, when the remote user is inexperienced, in dependence upon positive current mood for any weight and for long term weight loss in dependence upon mood; and/or
  (iv) automatically selecting content for delivery to a remote user as personalized content, when the remote user is experienced, in dependence upon short-term weight change and selected one of the multiple predetermined mood descriptors for the remote user.

19. A system comprising:
 a live-event module
 a processor configured to control the live-event module to
  provide a man machine interface configured to enable a local user to specify a state selected from a group comprising an output state and a potential-input state but not comprising a live-input state, and wherein a remote administrator can change a specified state from a potential-input state to a live-input state;
  provide a first variant of a first man machine interface that is configured to enable a user to input comment to be read by remote users and to read comments input by a remote administrator and to read comments input by remote users, if any, simultaneously using the first variant of the first man machine interface;
  provide a second variant of the man machine interface that is configured to enable the user to read comments input by the remote administrator and to read comments input by other remote users using the first variant of the first man machine interface but is not configured to enable the user to input comment to be read by other remote users;
  provide a third variant of the man machine interface that is configured to enable the user to read comments input by the remote administrator and to read comments input by other remote users using the first variant of the first man machine interface but is not configured to enable the user to input comment to be read by other remote users;
  at least provide a first user-selectable option and a second user-selectable option;
   wherein the first user-selectable option when selected causes a commitment man machine interface to be provided that enables recording of a user commitment to a weight loss target and at least one behavior, and
   wherein the second option when selected causes a content-delivery man machine interface to be provided that enables automatic personalized content delivery based upon at least one of a user input weight and a selected one of the multiple predetermined mood descriptors, before subsequently enabling recording of a user commitment to a weight loss and at least one behavior, wherein the enabling of automatic personalized content delivery comprises enabling:

(i) automatically selecting content for delivery to a remote user as personalized content, independently of experience, when a current weight for the remote user is indicative of a reversal from weight gain to weight loss, is indicative of achieving a weight loss target, is indicative of missing a weight loss target, is indicative of a chronic failure to lose weight, is indicative of repeatedly achieving weight loss targets, or is indicative of repeatedly missing weight loss targets; and/or (ii) automatically selecting content for delivery to a remote user as personalized content, when the remote user is inexperienced, independently of a current weight for the remote user, but in dependence upon selected one of the multiple predetermined mood descriptors for the remote user; and/or (iii) automatically selecting content for delivery to a remote user as personalized content, when the remote user is inexperienced, in dependence upon positive current mood for any weight and for long term weight loss in dependence upon mood; and/or (iv) automatically selecting content for delivery to a remote user as personalized content, when the remote user is experienced, in dependence upon short-term weight change and selected one of the multiple predetermined mood descriptors for the remote user.

20. A The system as claimed in claim 19, further comprising:
a commitment module configured to enable recording by the local user of the user commitment to the weight loss target and the at least one user behavior.

21. The system as claimed in claim 20, further comprising: a personal support module configured to enable the personalized content delivery based upon at least one of the user input weight and the selected one of multiple predetermined mood descriptors.

22. The system as claimed in claim 19 further comprising:
a weigh-in module configured to provide a man machine interface configured to enable a user to input the current weight and to select one of multiple predetermined mood descriptors; and
a personal support module configured to provide a man machine interface that enables automatic personalized content delivery based upon at least one of the user-input weight and selected one of the multiple predetermined mood descriptors.

23. The system as claimed in claim 19 further comprising:
a positive feedback module configured to initially and then repeatedly at different times provide the same user-selectable option or options to users for positive feedback only and configured to output positive feedback to other users.

24. The system as claimed in claim 23 further comprising:
a commitment module configured to prompt a user to commit to achieving a weight-loss target by a deadline and to commit to performing one or more behaviors before the deadline; and
a reminder module configured to provide a user with a prompt before the deadline.

* * * * *

UNITED STATES PATENT AND TRADEMARK OFFICE
CERTIFICATE OF CORRECTION

PATENT NO.        : 10,332,420 B2                                        Page 1 of 1
APPLICATION NO.   : 15/207912
DATED             : June 25, 2019
INVENTOR(S)       : Paul Sacher et al.

It is certified that error appears in the above-identified patent and that said Letters Patent is hereby corrected as shown below:

In the Claims

Column 28, Line 1 Claim 20 "A The system as claimed.." should read "The system as claimed"

Signed and Sealed this
Twenty-sixth Day of November, 2019

Andrei Iancu
*Director of the United States Patent and Trademark Office*